United States Patent
Kita

(10) Patent No.: US 8,634,002 B2
(45) Date of Patent: Jan. 21, 2014

(54) IMAGE PROCESSING DEVICE AND METHOD FOR IMAGE CORRECTION

(75) Inventor: Mitsuaki Kita, Kanagawa (JP)

(73) Assignee: Sony Corporation, Tokyo (JP)

(*) Notice: Subject to any disclaimer, the term of this patent is extended or adjusted under 35 U.S.C. 154(b) by 82 days.

(21) Appl. No.: 13/248,670

(22) Filed: Sep. 29, 2011

(65) Prior Publication Data

US 2012/0105688 A1 May 3, 2012

(30) Foreign Application Priority Data

Oct. 27, 2010 (JP) ................................ 2010-240227

(51) Int. Cl.
- *H04N 9/64* (2006.01)
- *H04N 5/217* (2011.01)
- *H04N 5/335* (2011.01)
- *H04N 5/222* (2006.01)

(52) U.S. Cl.
USPC ........... 348/242; 348/241; 348/273; 348/277; 348/302; 348/333

(58) Field of Classification Search
USPC .......... 348/242, 241, 273, 277, 281, 302, 333
See application file for complete search history.

(56) References Cited

U.S. PATENT DOCUMENTS

| | | | | |
|---|---|---|---|---|
| 5,608,455 A | * | 3/1997 | Oda | 348/295 |
| 2008/0291296 A1 | * | 11/2008 | Oike | 348/234 |
| 2009/0141150 A1 | * | 6/2009 | Tsuruoka | 348/242 |
| 2009/0146046 A1 | * | 6/2009 | Katsuda et al. | 250/201.6 |
| 2009/0153693 A1 | * | 6/2009 | Onuki et al. | 348/222.1 |
| 2010/0085449 A1 | * | 4/2010 | Nonaka et al. | 348/242 |

FOREIGN PATENT DOCUMENTS

JP    2009-145401    7/2009

* cited by examiner

*Primary Examiner* — James Hannett
*Assistant Examiner* — Padma Haliyur
(74) *Attorney, Agent, or Firm* — Sony Corporation

(57) ABSTRACT

An image processing device includes an input unit which inputs image data that is generated by an imaging element including specific pixels, first image generation pixels that are the image generation pixels adjacent to the specific pixels, and second image generation pixels that are the image generation pixels not adjacent to the specific pixels, and includes a luminance value generated by each of the pixels, and a color mixture correction unit which corrects color mixture such that a change value of luminance caused by light leaked from the specific pixels to the first image generation pixels is calculated based on luminance values of each of specific pixels adjacent to the first image generation pixels and correction of color mixture to the first image generation pixels caused by the leaked light is performed.

15 Claims, 25 Drawing Sheets

FIG. 9A
FIG. 9B
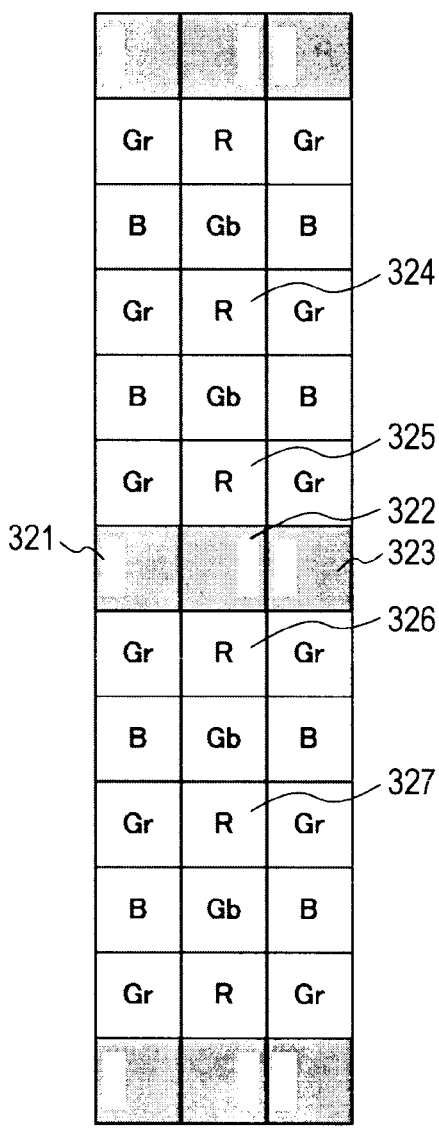
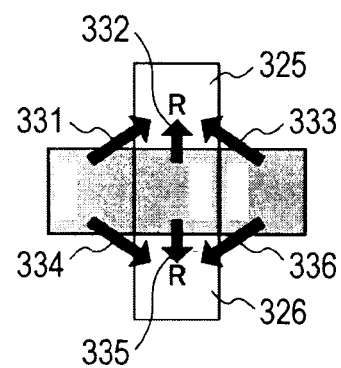

FIG. 12
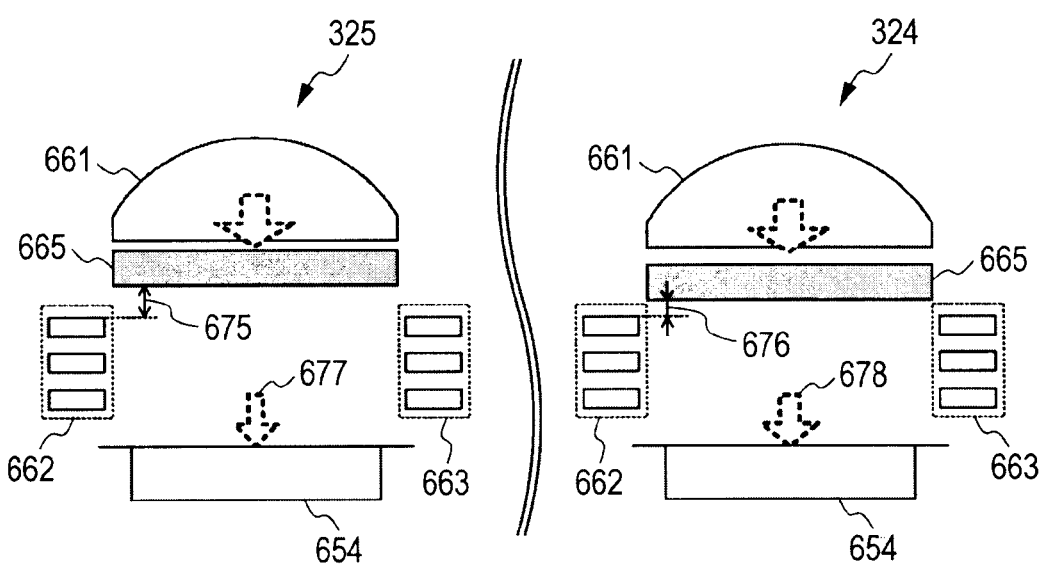
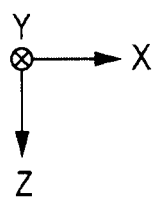

FIG. 21

IMAGE PROCESSING DEVICE AND METHOD FOR IMAGE CORRECTION

BACKGROUND

The present disclosure relates to an image processing device, and particularly to an image processing device that processes image data generated by imaging elements, a processing method thereof, and a program which causes a computer to execute the method.

In recent years, imaging devices such as digital still cameras have been distributed which generate a captured image by imaging a subject such as a person using imaging elements and record the generated captured image. As a photoelectric conversion element, generally, an element on which color filters are disposed in pixels arranged on a light sensing surface in Bayer array is used.

However, as such an imaging device has multi-functions and high image quality, an imaging element on which pixels other than pixels for image generation, or an imaging element on which pixels including color filters other than color filters (of R, G, B) used in Bayer array are arranged is discussed as pixels arranged on the imaging element. In other words, an imaging element on which pixels for image generation of the past (image generation pixels) and new pixels for multi-functions and high image quality are arranged together is discussed.

For example, as an imaging device including such an imaging element, there has been proposed an imaging device in which pixels which perform pupil-splitting for, for example, light passing through an imaging lens (phase difference detection element) are arranged in an imaging element (for example, refer to FIG. 15 of Japanese Unexamined Patent Application Publication No. 2009-145401). The imaging device forms a pair of images by providing phase difference detection pixels which perform pupil-splitting by blocking half of the light of a subject received by a light receiving element in the imaging element, and calculates the amount of deviation in the focus by measuring the interval between the thus-formed images. In addition, the imaging device calculates the amount of movement of the imaging lens based on the calculated amount of deviation in the focus, and performs auto-focusing by adjusting the position of the imaging lens based on the calculated amount of movement.

SUMMARY

Since both the phase difference detection pixels and the image generation pixels are provided in one imaging element in the above-described related art, it is not necessary to individually provide two kinds of imaging elements, which are an imaging element for focus detection and an imaging element for captured images, in the imaging device.

However, in the above-described related art, there is a case where a difference in characteristics of pixels occurs because pixels adjacent to the image generation pixels differ between image generation pixels adjacent to the phase difference detection pixels and image generation pixels not adjacent to the phase difference detection pixels. It is considered that deterioration in image quality is brought about due to the difference in characteristics.

For example, since color filters are not included in the phase difference detection pixels, the amount of light leaked from the phase difference detection pixels to the image generation pixels is relatively large. For this reason, it is assumed that the image generation pixels adjacent to the phase difference detection pixels have a large amount of light leaked from the adjacent pixels, in comparison to the image generation pixels not adjacent to the phase difference detection pixels. For this reason, there is concern that an image generated by the imaging element including both the phase difference detection pixels and the image generation pixels looks poor.

Therefore, an image correction process is necessary, which takes into account the difference between the characteristics of the image generation pixels adjacent to the phase difference detection pixels and the characteristics of the image generation pixels not adjacent to the phase difference detection pixels. In addition, the image correction process is necessary, which takes into account such a difference in characteristics for an image generated by an imaging element on which there are both image generation pixels and other different pixels (for example, white pixels).

The disclosure takes the above circumstances into consideration, and it is desirable to appropriately correct image data generated by an imaging element including both image generation pixels and other pixels.

According to an embodiment of the present disclosure, there is provided an image processing device, an image processing method thereof, and a program for causing computer to execute the method, the device including an input unit which inputs image data that is generated by an imaging element including specific pixels having color filters different from the color filters of the image generation pixels for generating an image or a configuration different from that of the image generation pixels, first image generation pixels that are the image generation pixels adjacent to the specific pixels, and second image generation pixels that are the image generation pixels not adjacent to the specific pixels, and includes a luminance value generated by each of the pixels, and a color mixture correction unit which corrects color mixture based on the input image data such that a change value of luminance caused by light leaked from the specific pixels to the first image generation pixels is calculated based on luminance values of each of specific pixels adjacent to the first image generation pixels and correction of color mixture to the first image generation pixels caused by the leaked light based on the calculated change value is performed. Accordingly, an effect of correcting color mixture of the first image generation pixels caused by light leaked from the specific pixels to the first image generation pixels is exhibited.

In addition, according to the embodiment of the disclosure, a value for calculating the amount of light leaked from the specific pixels based on luminance values of each of the specific pixels may be set to a light amount calculation coefficient, a correlation value between the amount of the leaked light and the change value of luminance may be set to a color mixture correction coefficient, and the color mixture correction unit may correct the color mixture by calculating the amount of light leaked from the specific pixels to the first image generation pixels based on the light amount calculation coefficient and luminance values of each of the specific pixels, calculating a change value of luminance relating to the first image generation pixels based on the calculated amount of light and the color mixture correction coefficient, and subtracting the calculated change value of luminance from the luminance value of the first image generation pixels. Accordingly, an effect of correcting color mixture of the first image generation pixels caused by light leaked from the specific pixels to the first image generation pixels using the light amount calculation coefficient and color mixture correction coefficient is exhibited. In addition, in this case, a light amount calculation coefficient retaining unit which retains a light amount calculation coefficient relating to each of the specific pixels adjacent to the first image generation pixels for each of the first image generation pixels, and a color mixture correction coefficient retaining unit which retains the color mixture correction coefficient for each of the first image generation pixels may be further included. Accordingly, an effect of correction is exhibited using the light amount calculation coefficient relating to each of the specific pixels adjacent to the first image generation pixels and the color mixture correction coefficient for each of the first image generation pixels.

In addition, according to the embodiment of the disclosure, a penetration rate correction unit may be further included, which performs correction such that a correlation value between a first penetration value, which is a luminance value based on light penetrating color filters of the first image generation pixels among luminance values of the first image generation pixels, and a second penetration value, which is a luminance value based on light penetrating color filters of the second image generation pixels among luminance values of the second image generation pixels having color filters with the same spectral characteristics as the first image generation pixels, is set to a sensitivity correction coefficient, a luminance value of the first image generation pixel of which color mixture is corrected is set to a first sensitivity value, and correction is performed for a difference in the amount of light which is incident to a micro-lens of the first image generation pixel and sensed on a light sensing element and the amount of light which is incident to a micro-lens of the second image generation pixels and sensed on the light sensing element based on the luminance value and the sensitivity correction coefficient. Accordingly, an effect of correcting a difference in the amount of light which is incident to the micro-lens and sensed on the light sensing element is exhibited.

In addition, according to the embodiment of the disclosure, the specific pixels having a different configuration from the image generation pixels may be phase difference detection pixels for performing focusing determination by phase difference detection. Accordingly, an effect of correcting color mixture of the first image generation pixels caused by light leaked from the phase difference detection pixels for performing focusing determination by phase difference detection to the first image generation pixels is exhibited. In addition, in this case, a correlation value between a dark current value of the first image generation pixels and a dark current value of the second image generation pixels calculated using an optical black area may be set to a dark current correction coefficient, and a dark current correction unit may be further included, which corrects dark current of the first image generation pixel by calculating the dark current value of the first image generation pixels based on the dark current correction coefficient and the dark current value of the second image generation pixels relating to the input image data, and subtracting the calculated dark current value from the luminance value of the first image generation pixels. Accordingly, an effect of correcting the dark current of the first image generation pixels adjacent to the phase difference detection pixels using the dark current correction coefficient is exhibited.

In addition, according to the embodiment of the disclosure, the specific pixels having color filters different from the color filters of the image generation pixels may be pixels having white filters through which light of the wavelength of a visible light region penetrates. Accordingly, an effect of correcting the color mixture of the first image generation pixels caused by light leaked from the pixels having the white filters to the first image generation pixels is exhibited.

In addition, according to the embodiment of the disclosure, in the imaging element, a first pixel group of which the specific pixels are configured to be arranged in a specific direction and a second pixel group of which the image generation pixels are configured to be arranged in a specific direction may be alternately arranged in an orthogonal direction which is orthogonal to the specific direction. Accordingly, an effect of correcting an image generated by the imaging element in which a first pixel group of which the specific pixels are configured to be arranged in a specific direction and a second pixel group of which the image generation pixels are configured to be arranged in a specific direction are alternately arranged in an orthogonal direction which is orthogonal to the specific direction is exhibited. In addition, in this case, in the imaging element, the image generation pixels may be arranged in Bayer array in the second pixel group. Accordingly, an effect of correcting an image generated by the imaging element in which the image generation pixels are arranged in Bayer array in the second pixel group is exhibited.

In addition, according to another embodiment of the disclosure, there is provided an imaging device including an imaging element including specific pixels having color filters different from color filters of image generation pixels for generating an image or a configuration different from that of the image generation pixels, first image generation pixels that are the image generation pixels adjacent to the specific pixels, and second image generation pixels that are the image generation pixels not adjacent to the specific pixels, and generating image data including a luminance value generated by each pixel, and a color mixture correction unit which corrects color mixture based on the generated image data such that a change value of luminance caused by light leaked from the specific pixels to the first image generation pixels is calculated based on luminance values of each of specific pixels adjacent to the first image generation pixels and correction of color mixture to the first image generation pixels caused by the leaked light based on the calculated change value is performed. Accordingly, an effect of correcting color mixture of the first image generation pixels caused by light leaked from the specific pixels to the first image generation pixels is exhibited.

In addition, according to still another embodiment of the disclosure, there is provided an image processing device including an input unit which inputs image data that is generated by an imaging element including specific pixels having color filters different from color filters of image generation pixels for generating an image or a configuration different from that of the image generation pixels, first image generation pixels that are the image generation pixels adjacent to the specific pixels, and second image generation pixels that are the image generation pixels not adjacent to the specific pixels, and includes a luminance value generated by each of the pixels, and a penetration rate correction unit which corrects a difference in the amount of light which is incident to micro-lenses and sensed on a light sensing element between the first image generation pixels and the second image generation pixels having color filters with the same spectral characteristics as the first image generation pixels based on the input image data, using a correlation value of the difference. Accordingly, an effect of correcting a difference in the amount of light which is incident to micro-lenses and sensed on a light sensing element between the first image generation pixels and the second image generation pixels having color filters with the same spectral characteristics as the first image generation pixels using a correlation value of the difference is exhibited.

In addition, according to still another embodiment of the disclosure, there is provided an image processing device including an input unit which inputs image data that is generated by an imaging element including specific pixels having a configuration different from that of the image generation pixels for generating images, first image generation pixels that are the image generation pixels adjacent to the specific pixels, and second image generation pixels that are the image generation pixels not adjacent to the specific pixels, and includes a luminance value generated by each of the pixels, and a dark current correction unit which corrects dark current of the first image generation pixels in the input image data based on a correlation value of a dark current value of the first image generation pixels and a dark current value of the second image generation pixels relating to the input image data. Accordingly, an effect of correcting the dark current of the first image generation pixels in the input image data based on the correlation value of the dark current value of the first image generation pixels and the dark current value of the second image generation pixels relating to the input image data is exhibited.

According to the embodiments of the disclosure, an excellent effect will be exhibited in that image data generated by an imaging element including both image generation pixels and other pixels can be appropriately corrected.

BRIEF DESCRIPTION OF THE DRAWINGS

FIGS. 9A and 9B are diagrams showing the pixel arrangement of the imaging element for illustrating calculation of a color mixture correction coefficient of the R pixel in the first embodiment of the disclosure;

FIG. 12 is a diagram showing the pixel arrangement of the imaging element for illustrating calculation of a sensitivity correction coefficient of an R pixel in the first embodiment of the disclosure;

FIG. 21 is a schematic diagram showing an example of the arrangement of pixels included in an imaging element according to a second embodiment of the disclosure;

DETAILED DESCRIPTION OF EMBODIMENTS

Hereinafter, embodiments of the disclosure (hereinafter, referred to as "embodiments") will be described. Description will be provided in the following order.

1. First Embodiment (Luminance value correction control: an example of an imaging element on which phase difference detection pixels and image generation pixels are arranged)

2. Second Embodiment (Luminance value correction control: an example of an imaging element on which white pixels and image generation pixels are arranged)

3. Third Embodiment (Luminance value correction control: an example of an imaging device not including a correction coefficient calculation operation)

1. First Embodiment

[Example of Functional Configuration of Imaging Device]

Figure 1:
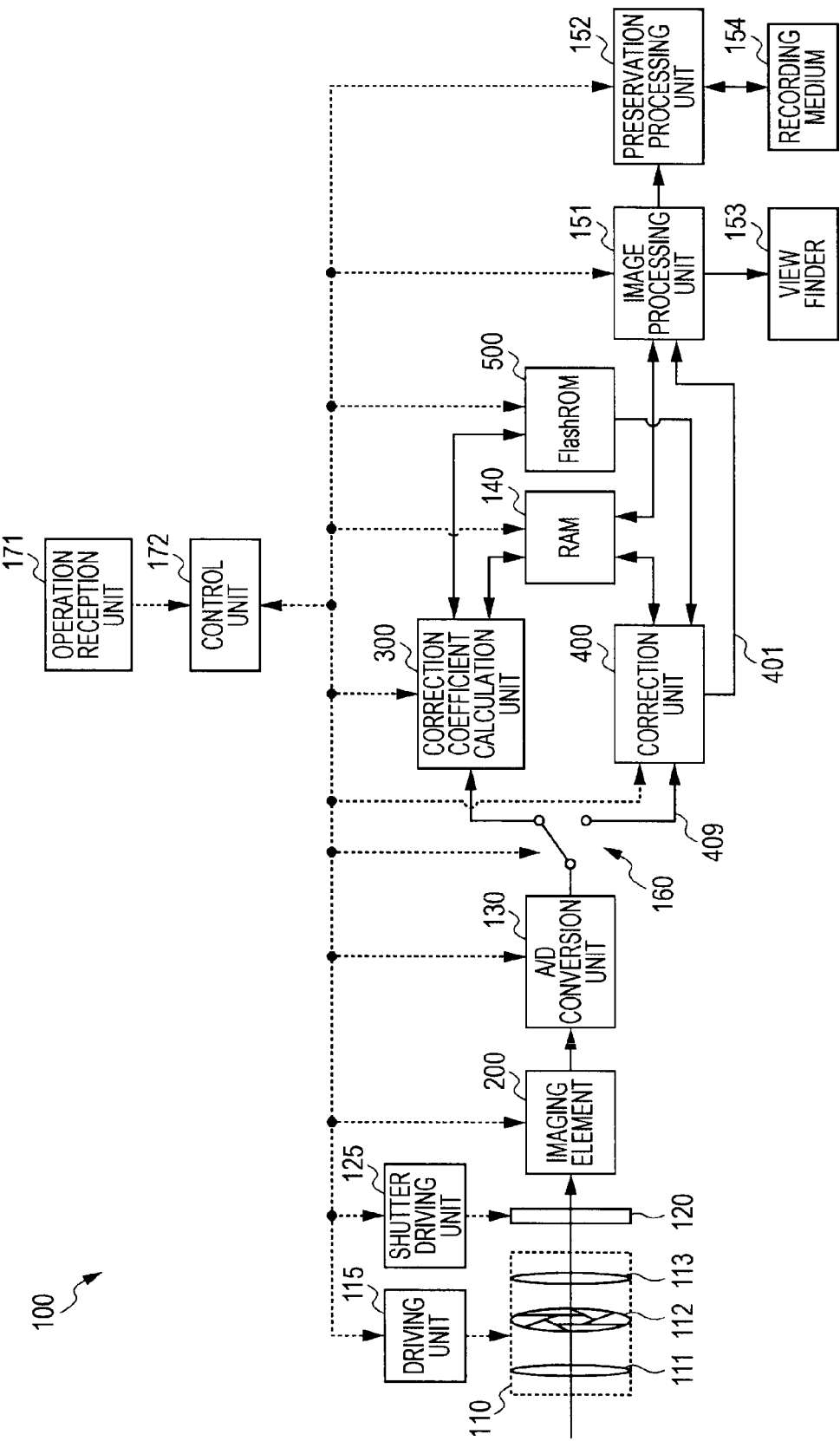
FIG. 1 is a block diagram showing an example of a functional configuration of an imaging device in a first embodiment of the present disclosure.

FIG. 1 is a block diagram showing an example of a functional configuration of an imaging device 100 according to a first embodiment of the present disclosure. The imaging device 100 is an imaging device which generates image data by capturing a subject and records the generated image data as image content (recorded image).

The imaging device 100 includes a lens unit 110, a driving unit 115, a shutter unit 120, a shutter driving unit 125, an imaging element 200, an A/D (Analog/Digital) conversion unit 130, and a changeover switch 160. In addition, the imaging device 100 also includes a correction coefficient calculation unit 300, a RAM (Random Access Memory) 140, and a FlashROM (Read Only Memory) 500. In addition, the imaging device 100 includes a correction unit 400, an image processing unit 151, a preservation processing unit 152, a view finder 153, a recording medium 154, an operation reception unit 171, and a control unit 172.

The lens unit 110 is for condensing light from a subject (subject light). The lens unit 110 includes a zoom lens 111, diaphragm 112, and a focus lens 113.

The zoom lens 111 changes the focal length by being moved in the optical axis direction by driving of the driving unit 115, and adjusts the magnification of the subject to be included in a captured image.

The diaphragm 112 is a shielding material for changing the degree of the aperture by driving of the driving unit 115 and adjusting the amount of the subject light incident to the imaging element 200.

The focus lens 113 is to adjust the focus by being moved in the optical axis direction by driving of the driving unit 115.

The driving unit 115 is for driving the zoom lens 111, the diaphragm 112, and the focus lens 113. For example, the driving unit 115 causes the focus lens 113 to move according to the amount of driving of the focus lens 113 calculated in the control unit 172.

The shutter unit 120 performs opening and blocking the light path of incident light from the subject incident to the imaging element 200 with a curtain moving to the upper and lower directions, and driven by the shutter driving unit 125. In addition the shutter unit 120 supplies incident light from the subject to the imaging element 200 when the light path is open.

The shutter driving unit 125 causes the shutter in the shutter unit 120 to drive.

The imaging element 200 performs photoelectric conversion for incident light from the subject to electrical signals, and generates analog electrical signals by receiving the incident light from the subject. In addition, the imaging element 200 is realized by, for example, a CMOS (Complementary Metal Oxide Semiconductor) sensor and a CCD (Charge Coupled Device) sensor. In the imaging element 200, pixels generating signals for generating a captured image based on received subject light (image generation pixels) and other pixels generating signals other than the signals for generating a captured image (specific pixels) are arranged. In the first embodiment of the disclosure, as other pixels (specific pixels), pixels generating signals for performing focusing determination of focus in a phase difference detection method (phase difference detection pixels) are arranged. Herein, the phase difference detection method is a focus detection method in which a pair of images are formed by performing pupil-splitting for light passing through an imaging lens, the interval of the thus-formed images (or the deviation amount between the images) is measured (or a phase difference is detected), thereby detecting the degree of the focusing.

In addition, on the imaging element 200, pixels sensing red (R) light (R pixels) by a color filter through which the red light penetrates, and pixels sensing green (G) light (G pixels) by a color filter through which the green light penetrates are arranged as image generation pixels. In addition, on the imaging element 200, in addition to the R pixels and the G pixels, pixels sensing blue (B) light (B pixels) by a color filter through which the blue light penetrates are arranged as such image generation pixels. Furthermore, the imaging element 200 will be described with reference to FIGS. 3 to 5.

The A/D conversion unit 130 is for converting analog signals supplied from the imaging element 200 to digital signals. The A/D conversion unit 130 supplies signals (a luminance value) generated by the conversion of the digital signals to the changeover switch 160 for each captured image (image data).

The changeover switch 160 changes over the supply destination of the image data supplied from the A/D conversion unit 130. The changeover switch 160 connects the A/D conversion unit 130 and the correction coefficient calculation unit 300 when a correction coefficient is to be calculated. In addition, the changeover switch 160 connects the A/D conversion unit 130 and the correction unit 400 when the calculation of the correction coefficient ends. In other words, the changeover switch 160 connects the A/D conversion unit 130 and the correction coefficient calculation unit 300 when a correction coefficient is to be calculated in the course of manufacturing the imaging device 100 in a factory. In addition, when a user images a subject using the imaging device 100, the A/D conversion unit 130 and the correction unit 400 are connected to each other through the changeover switch 160.

The correction coefficient calculation unit 300 is for calculating a correction coefficient for correcting a difference in characteristics between image generation pixels adjacent to the phase difference detection pixels and image generation pixels not adjacent thereto in the process of calculating a correction coefficient (correction coefficient calculation operation). The correction coefficient calculation unit 300 calculates a dark current correction coefficient, a color mixture correction coefficient, and a sensitivity correction coefficient, as correction coefficients for correcting the difference in the characteristics. Herein, the dark current correction coefficient is a coefficient for correcting a difference in dark currents generated by high density of metal layers in the phase difference detection pixels. In addition, the color mixture correction coefficient is a coefficient for correcting a difference in degrees of color mixture occurring by light leaked from the phase difference detection pixels. In addition, the sensitivity correction coefficient is a coefficient for correcting a difference in sensitivity occurring by a slight difference in configurations between the image generation pixels adjacent to the phase difference detection pixels and the image generation pixels not adjacent thereto. The calculation of the dark current correction coefficient will be described with reference to FIGS. 6A and 6B. The calculation of the color mixture correction coefficient will be described with reference to FIGS. 7A to 11B. The calculation of the sensitivity correction coefficient will be described with reference to FIG. 12.

The correction coefficient calculation unit 300 calculates each correction coefficient using the image data supplied from the A/D conversion unit 130 with the RAM 140 as a working memory. The correction coefficient calculation unit 300 causes the FlashROM 500 to record the calculated correction coefficient.

The RAM 140 is a working memory in the imaging device 100.

The FlashROM 500 is for recording each correction coefficient calculated by the correction coefficient calculation unit 300. In addition, the FlashROM 500 records a coefficient (light amount calculation coefficient) for calculating the amount of light leaked from the phase difference detection pixels (color mixture-derived light) based on the amount of light sensing of the phase difference detection pixels. Furthermore, the light amount calculation coefficient will be described with reference to FIGS. 9A to 11B. The FlashROM 500 supplies retained correction coefficients and the light amount calculation coefficient to the correction unit 400 when the difference in the characteristics between the image generation pixels adjacent to the phase difference detection pixels and the image generation pixels not adjacent thereto is corrected (correction operation).

The correction unit 400 is for correcting a luminance value of the image generation pixels adjacent to the phase difference detection pixels in the image data generated by the imaging operation of a user, and correcting a difference in characteristics between the image generation pixels adjacent to the phase difference detection pixels and the image generation pixels not adjacent thereto. Correction by the correction unit 400 will be described with reference to FIGS. 18 to 19B. The correction unit 400 supplies the image data of which the luminance value of the image generation pixels adjacent to the phase difference detection pixels is changed by correction (corrected image data) to the image processing unit 151.

The image processing unit 151 performs a predetermined signal processing for the corrected image data supplied from the correction unit 400 to prepare development image data. The image processing unit 151 complements color information in the corrected image data, corrects white balance, and performs a signal processing accompanied by development of gamma correction, following, for example, control signals from the control unit 172. In addition, the image processing unit 151 supplies the prepared development image data to the view finder 153 and the preservation processing unit 152.

The preservation processing unit 152 generates recording data to be recorded on the recording medium 154 based on the development image data supplied from the image processing unit 151. The preservation processing unit 152 compresses the development image data supplied from the image processing unit 151 into, for example, a JPEG (Joint Photographic Experts Group) format, and records JPEG data (recording data) generated by the compression to the recording medium 154.

The view finder 153 is for displaying images to the user based on the development image data supplied from the image processing unit 151. The view finder 153 is realized by, for example, a color liquid crystal panel.

The recording medium 154 is for recording the recording data supplied from the preservation processing unit 152 as image content (image file). As the recording medium 154, for example, a removable recording medium (1 or a plurality of recording media) such as a semiconductor memory including a memory card, or a disk including a DVD (Digital Versatile Disk) can be used. In addition, such a recording medium may be included in the imaging device 100 or may be mounted on or removed from the imaging device 100.

The operation reception unit 171 is for receiving an operation from the user. The operation reception unit 171 supplies a signal relating to press-down to the control unit 172 as an operation signal when, for example, a shutter button (not shown in the drawing) is pressed down.

The control unit 172 is for controlling operations of each unit in the imaging device 100. The control unit 172 is configured by a micro-computer including a ROM in which a control program is stored. The control unit 172 supplies a signal relating to recording execution of a still image (still image imaging operation signal) to each unit when, for example, the shutter button is pressed down and an operation signal for starting recording of the still image is received. In addition, when control of the focus is to be performed, the control unit determines whether or not the focus is taken for a target object to be focused (focusing target) based on a signal generated by the phase difference detection pixels (phase difference detection data). Then, when the focus is taken, a signal for maintaining the current position of the focus lens 113 is supplied to the driving unit 115. In addition, when the focus is not taken for the focusing target, the amount of deviation in focusing (defocus amount) is calculated, and the amount of driving is calculated based on the calculated defocus amount and the position of the focus lens 113, and a signal indicating the amount of driving is supplied to the driving unit 115.

[One Example of Flow of Signal in Correction Coefficient Calculation Operation]

Figure 2:
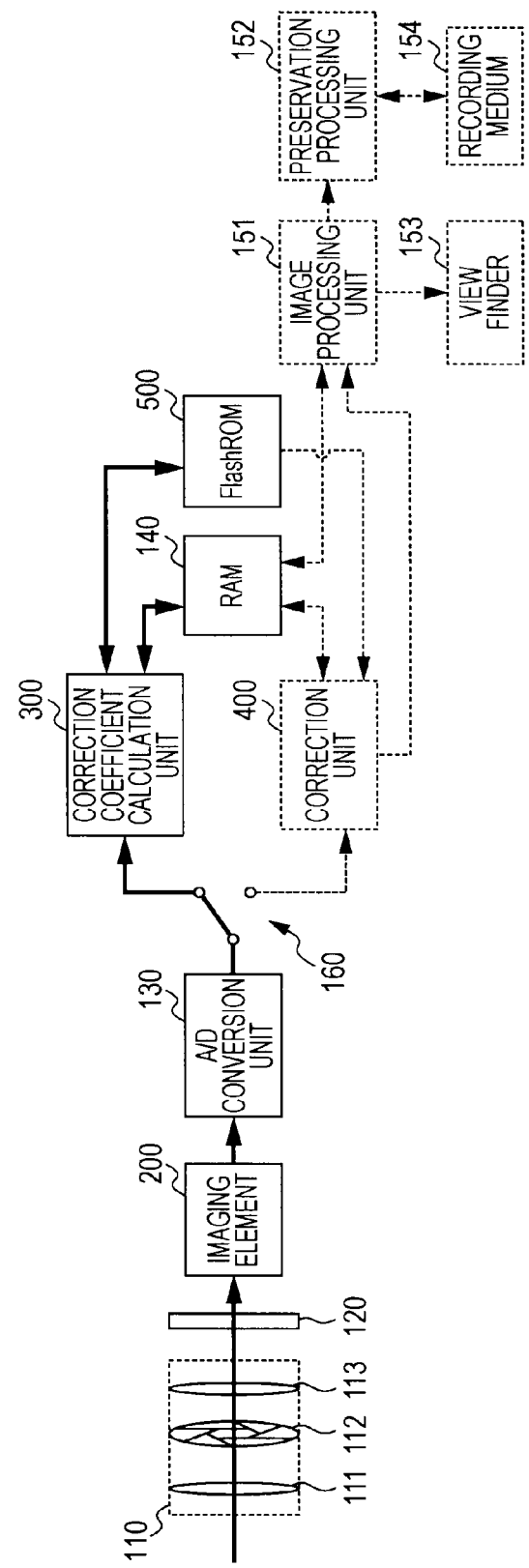
FIG. 2 is a schematic diagram showing an example of the flow of signals in an operation (correction coefficient calculation operation) of the imaging device when a correction coefficient is calculated in the first embodiment of the disclosure.

FIG. 2 is a schematic diagram showing an example of the flow of signals in an operation (correction coefficient calculation operation) of the imaging device 100 when a correction coefficient is calculated in the first embodiment of the disclosure.

In the drawing, constituent elements relating to a correction coefficient calculation operation are shown by blocks of solid lines among constituent elements in the imaging device 100 shown in FIG. 1, and constituent elements not relating to the correction coefficient calculation operation are shown by blocks of dashed lines. In addition, in FIG. 2, the flow of signals from when the imaging element 200 senses light to when the FlashROM 500 records a correction coefficient is shown by thick black arrows. In addition, in FIG. 2, the operation reception unit 171 and the control unit 172 are omitted for convenience of description.

Figure 3:
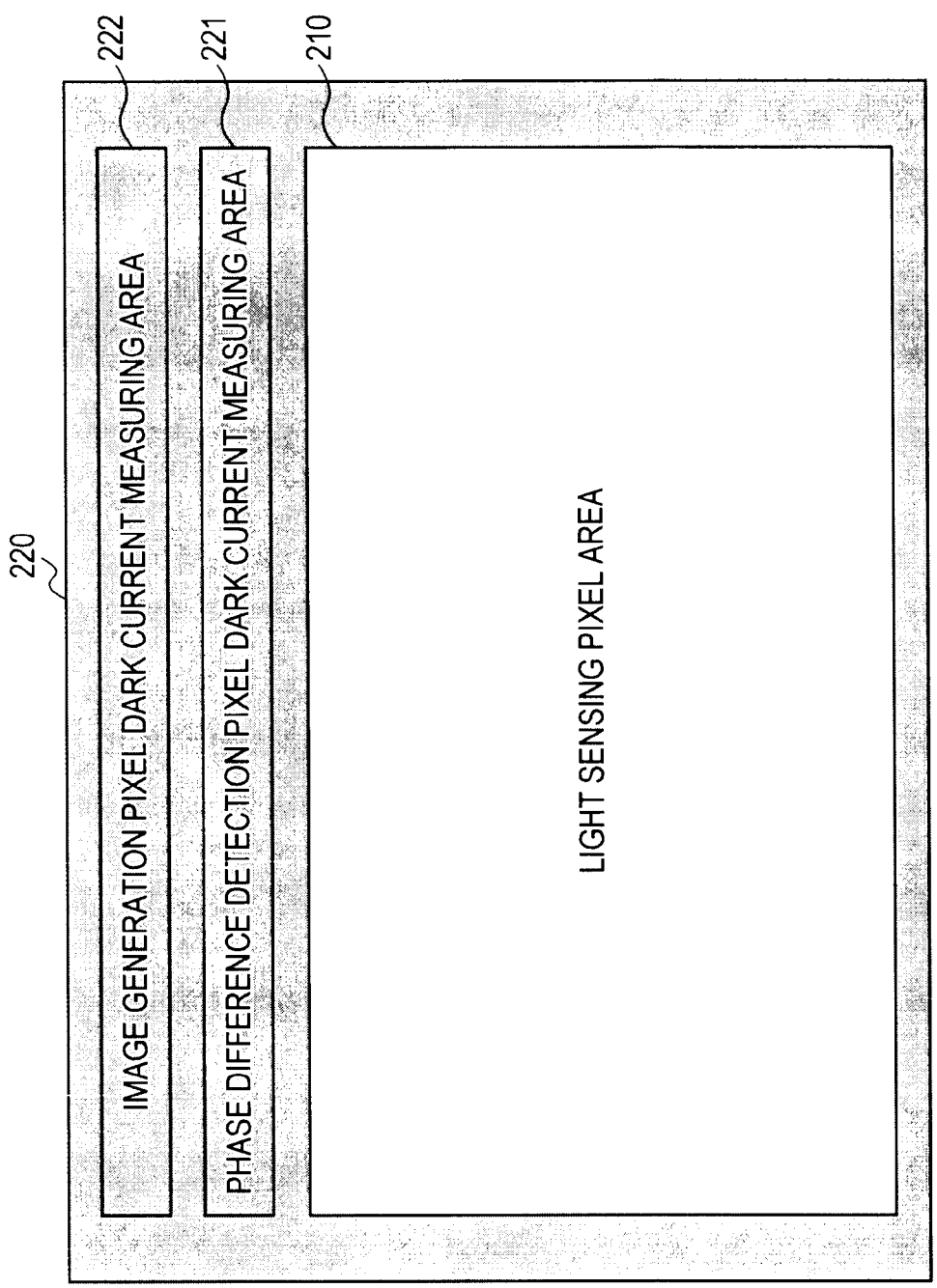
FIG. 3 is a schematic diagram showing an example of pixel areas of an imaging element in the first embodiment of the disclosure.
Figure 4:
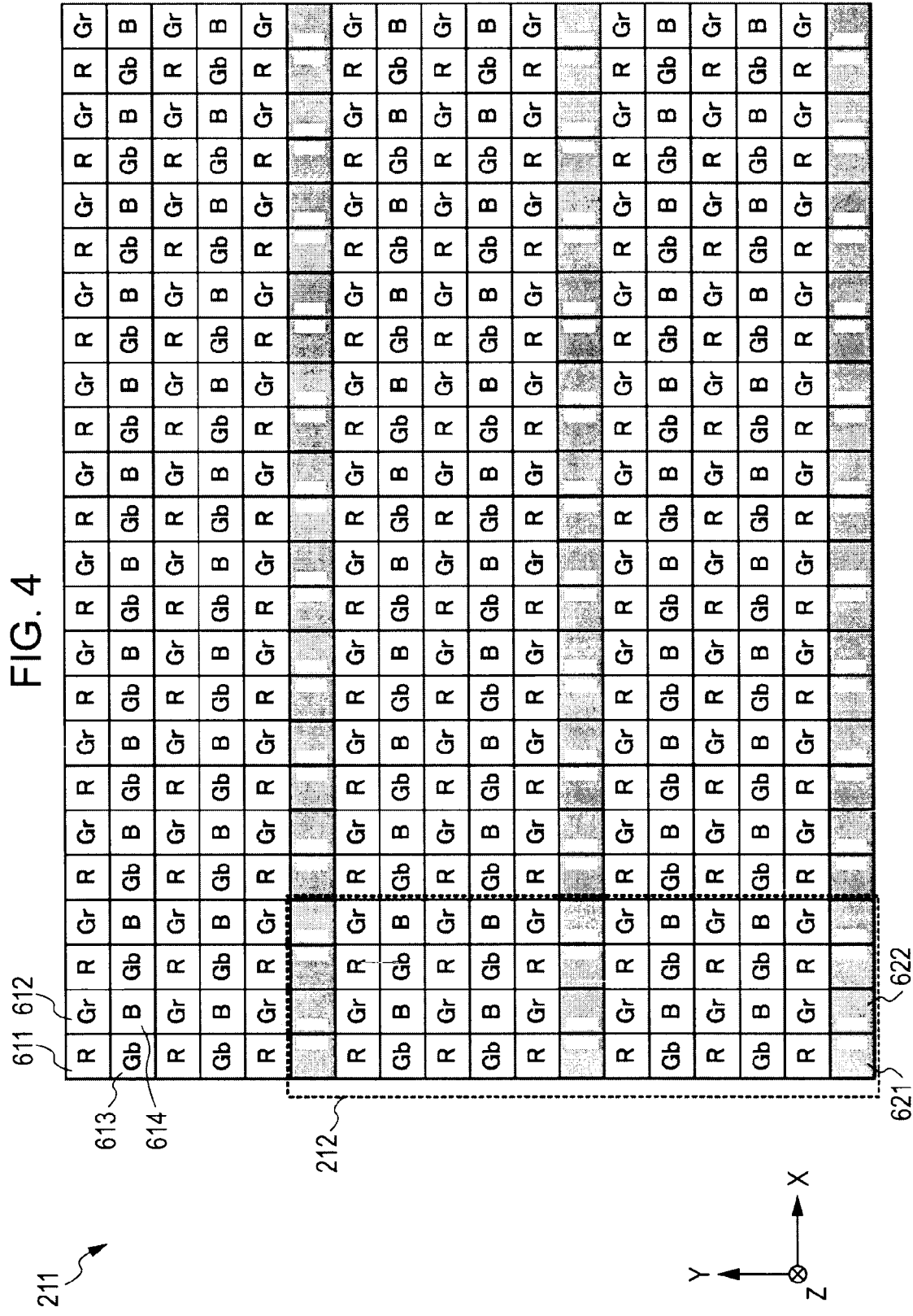
FIG. 4 is a schematic diagram showing an example of the arrangement of pixels included in the imaging element in the first embodiment of the disclosure.
Figure 5:
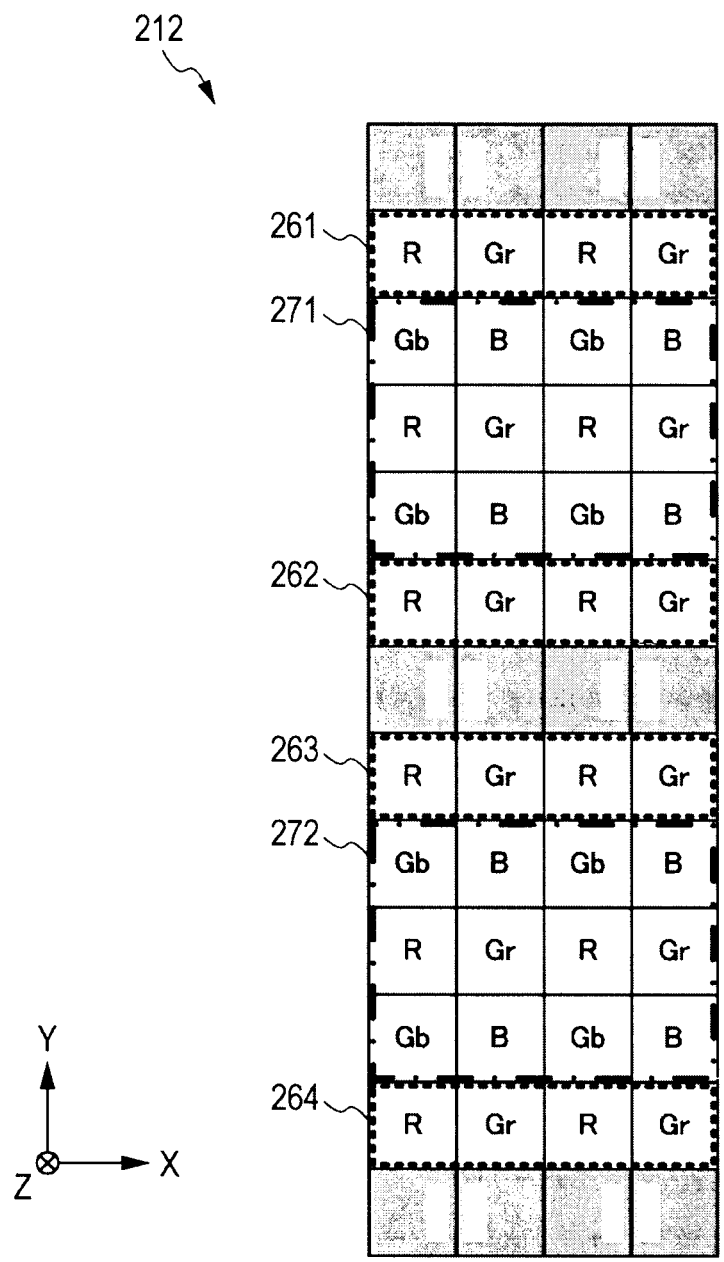
FIG. 5 is a top view schematically showing an example of the arrangement of pixels in an area of the imaging element in the first embodiment of the disclosure.

As shown in the drawing, in the correction coefficient calculation operation, the A/D conversion unit 130 and the correction coefficient calculation unit 300 are connected to each other by the changeover switch 160. Accordingly, the image data generated by the imaging element 200 imaging the subject is digitalized by the A/D conversion unit 130 and supplied to the correction coefficient calculation unit 300. In addition, the correction coefficient calculation unit 300 calculates each of correction coefficients (a dark current correction coefficient, a color mixture correction coefficient, and a sensitivity correction coefficient) using the RAM 140 as a working memory, and records the calculated correction coefficients on the FlashROM 500. In FIGS. 3 to 5, the imaging element 200 will be described. The calculation of the dark current correction coefficient will be described in FIGS. 6A and 6B, the calculation of the color mixture correction coefficient will be described in FIGS. 7A to 11B, and the calculation of the sensitivity correction coefficient will be described in FIG. 12.

[Example of Pixel Area in Imaging Element]

FIG. 3 is a schematic diagram showing an example of a pixel area of the imaging element 200 according to the first embodiment of the disclosure.

In the drawing, a light sensing pixel area 210 shown in the white area and an optical black area 220 shown in the gray area are shown as areas in the imaging element 200. In addition, as a part of the optical black area 220, a phase difference detection pixel dark current measuring area 221 and an image generation pixel dark current measuring area 222 are shown.

The light sensing pixel area 210 is an area where pixels that can sense subject light are arranged, and that can be also referred to as an effective pixel area.

The optical black area 220 is an area where pixels for which light is shielded are arranged. The pixels arranged in the optical black area 220 can output black (non-light sensing) signals even when pixels in the light sensing pixel area 210 sense light and signals according to the amount of light sensed are generated. The black signals generated by the light sensing pixel area 210 can be used as signals indicating the dark current of the pixels in the light sensing pixel area 210.

The phase difference detection pixel dark current measuring area 221 is an area where the phase difference detection pixels for measuring the amount of generated dark current of the phase difference detection pixels are arranged in the optical black area 220. For example, the correction coefficient calculation unit 300 and the correction unit 400 calculate an average value of a signal (luminance value) output from the phase difference detection pixels arranged in the phase difference detection pixel dark current measuring area 221 and sets the calculated average value to the amount of generated dark current of the phase difference detection pixels (phase difference detection pixel dark current value). Furthermore, the operation to calculate the average value is performed every time new image data is generated (or every time of imaging), and used to remove noise caused by dark current from the signal of the phase difference detection pixels (dark current correction).

The image generation pixel dark current measuring area 222 is an area where the image generation pixels for measuring the amount of generated dark current (normal pixel dark current value) of the image generation pixels not adjacent to the phase difference detection pixels (normal pixels) are arranged in the optical black area 220. For example, in order to calculate the amount of generated dark current of R pixels not adjacent to the phase difference detection pixels (normal R pixels), the correction coefficient calculation unit 300 and the correction unit 400 calculate an average value of signals output from a plurality of normal R pixels arranged in the image generation pixel dark current measuring area 222. In the same manner, the amount of generated dark current of Gr pixels not adjacent to the phase difference detection pixels (normal Gr pixels) is calculated based on an average value of signals output from a plurality of normal Gr pixels arranged in the image generation pixel dark current measuring area 222. In addition, in the same manner, the amount of generated dark current of B pixels not adjacent to the phase difference detection pixels (normal B pixels) is calculated based on an average value of signals output from a plurality of normal B pixels arranged in the image generation pixel dark current measuring area 222. Such operation to calculate average values is performed every time of imaging and used when dark current correction is performed for the signal of the image generation pixels, in the same manner as the amount of generated dark current of the phase difference detection pixels.

Furthermore, the correction of the dark current of the normal pixels in image data of captured images is performed by subtracting such normal pixel dark current values.

[Example of Arrangement of Pixels in Imaging Element]

FIG. 4 is a schematic diagram showing an example of the arrangement of pixels included in the imaging element 200 according to the first embodiment of the disclosure.

In the same drawing, description will be provided assuming XY axes which has the Y axis in the left-right direction and the X axis in the upper-lower direction. In addition, in the drawing, the lower right corner is set to the origin of the XY axes, the direction from lower side to the upper side is set to a + side of the X axis, and the direction from the right side to the left side is set to a + side of the Y axis. Furthermore, the direction of reading the signals in the imaging element 200 is set to the X-axis direction (or the signals are read in the unit of rows).

In the drawing, description will be provided using an area (area 211) of some pixels (pixels with 18 rows×24 columns) among pixels constituting the imaging element 200 for convenience. Furthermore, the arrangement of pixels in the imaging element 200 is arrangement in which the pixel arrangement shown in the area 211 is set to one unit, and pixel arrangement corresponding to the unit (the pixel arrangement corresponding to the area 211) is repeated in the X-axis direction and Y-axis direction.

In the drawing, one pixel is expressed by one square. An image generation pixel is expressed by a square showing a sign indicating a color filter provided in the pixel. In addition, in regard to G (green) pixels, a G (green) pixel in a row (line) including R pixels (R pixel 611) is indicated by a Gr pixel (Gr pixel 612), and a G pixel in a row (line) including B pixels (B pixel 614) is indicated by a Gb pixel (Gb pixel 613).

In addition, a phase difference detection pixel is expressed by a gray square. Furthermore, in the phase difference detection pixel, a side where incident light is not shielded in a light-shielding layer and a light sensing element senses light (a side of the light shielding layer having an opening part) is expressed by a white rectangle.

Herein, the phase difference detection pixels (phase difference detection pixels 621 and 622) shown in the drawing will be described.

The phase difference detection pixel 621 is a phase difference detection pixel formed with the light-shielding layer so that subject light which passes through the right half of an exit pupil out of subject light incident to a micro-lens of the phase difference detection pixel 621 is shielded. In other words, the phase difference detection pixel 621 shields the right half of the light out of light that underwent pupil-splitting to the left and right side of the exit pupil (+ and −side in the X-axis direction) and senses light of which the left half underwent pupil-splitting.

The phase difference detection pixel 622 is a phase difference detection pixel formed with the light-shielding layer so that subject light which passes through the left half of the exit pupil out of subject light incident to a micro-lens of the phase difference detection pixel 622 is shielded. In other words, the phase difference detection pixel 622 shields the left half of the light out of light that underwent pupil-splitting to the left and right side of the exit pupil (+ and − side in the X-axis direction) and senses light of which the right half underwent pupil-splitting. In addition, the phase difference detection pixel 622 forms a pair of images as being used in a pair of the phase difference detection pixels 621.

Herein, the arrangement of pixels in the imaging element 200 will be described.

In the imaging element 200, a plurality of row (lines) in which the image generation pixels are arranged and one row (line) in which the phase difference detection pixels are arranged are alternately arranged in the direction orthogonal to the reading direction (the column direction in the first embodiment of the disclosure). FIG. 4 shows an example where the number of consecutive rows of the image generation pixels is five. Furthermore, in the consecutive rows of the image generation pixels, the image generation pixels are positioned in Bayer array. In addition, the same drawing shows an example of the row of the image generation pixels adjacent to a row of the phase difference detection pixels, in which R pixels and Gr pixels are arranged. Furthermore, the number of consecutive rows of the image generation pixels is the number of the image generation pixels occurring, which include color filters having the same spectral characteristics as the color filters included in the image generation pixels adjacent to the row of the phase difference detection pixels and is not adjacent to the phase difference detection pixels. In other words, the number of the consecutive rows of the image generation pixels is higher than five rows in which R pixels and Gr pixels that are not adjacent to the phase difference detection pixels are arranged in the first embodiment of the disclosure in which only R pixels and Gr pixels are adjacent to the rows of the phase difference detection pixels.

As such, in the imaging element 200, the R pixels and the Gr pixels that are adjacent to the phase difference detection pixels and the R pixels and the Gr pixels that are not adjacent to the phase difference detection pixels are arranged. Since the characteristics of the R pixels and the Gr pixels that are adjacent to the phase difference detection pixels has a difference from those of the R pixels and the Gr pixels that are not adjacent thereto, correction is necessary.

Next, pixels as the correction target (the R pixels and the Gr pixels that are adjacent to the phase difference detection pixels) in the first embodiment of the disclosure will be described with reference to FIG. 5, focusing on pixels included in the area 212 (13×4 pixels).

[Example of Correction Target Pixels in Imaging Element]

FIG. 5 is a top view schematically showing an example of the arrangement of pixels in the area 212 of the imaging element 200 according to the first embodiment of the disclosure. Furthermore, in the same drawing, X and Y axes are assumed by setting the left and right direction to the X axis and the upper and lower direction to the Y axis. In addition, the reading direction of signals is set to the X axis direction (read by a row unit).

In the same drawing, as pixel arrangement in the imaging element 200 of the first embodiment of the disclosure, pixels corresponding to the area 212 of FIG. 4 are shown. In addition, FIG. 5 shows areas showing pixels as correction targets in the correction unit 400 (areas 261 to 264) and areas showing pixels not to be corrected (areas 271 and 272).

Each pixel in the areas 261 to 264 is adjacent to three phase difference detection pixels and five image generation pixels. On the other hand, each pixel of the areas 271 and 272 is adjacent to eight pixels which are all image generation pixels. In other words, a difference occurs in the pattern of color filters of adjacent pixels and the configuration of pixels circuits between R pixels in the areas 261 to 264 and R pixels in the areas 271 and 272 (the same is applied to Gr pixels). For this reason, due to a difference in the amount of light leaked from adjacent pixels and a difference in the amount of light lost in the course of light convergence of a micro-lens to light sensing by the light sensing element, a difference occurs in the magnitude of generated signals (luminance values) even if the same amount of light is sensed. In addition, due to a slight difference in distortion caused by the difference in the configurations of adjacent pixels, a difference occurs in the amount of generated dark current.

Thus, in order to correct such differences in characteristics, a dark current correction coefficient, a color mixture correction coefficient, and a sensitivity correction coefficient are calculated in a correction coefficient calculation operation.

[Calculation Example of Dark Current Correction Coefficient by Correction Coefficient Calculation Unit]

Figure 6A:
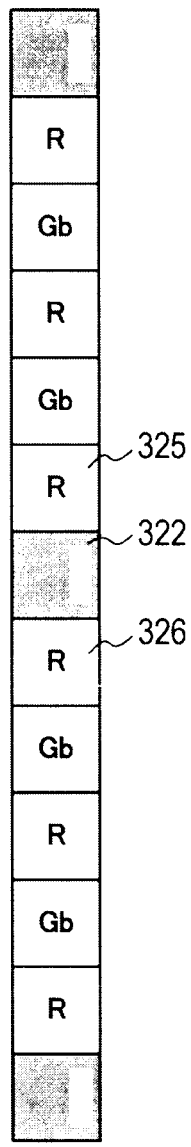
FIGS. 6A and 6B are diagrams showing the pixel arrangement of the imaging element for illustrating calculation of dark current correction coefficient of a correction coefficient calculation unit in the first embodiment of the disclosure.
Figure 6B:
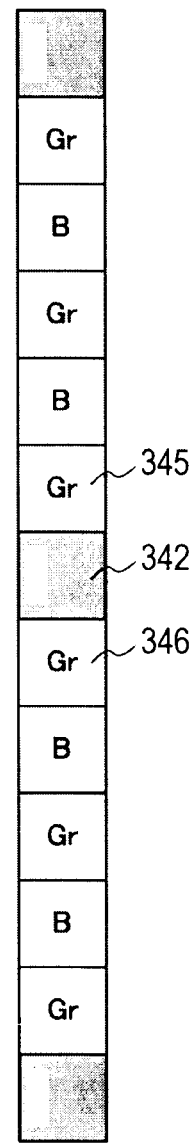

FIGS. 6A and 6B are a diagram showing the pixel arrangement of the imaging element 200 for illustrating calculation of a dark current correction coefficient of the correction coefficient calculation unit 300 according to the first embodiment of the disclosure.

FIG. 6A shows one column including R pixels of the area 212 shown in FIG. 5 in order to explain a dark current correction coefficient of the R pixels adjacent to the phase difference detection pixels.

In FIG. 6A, the calculation of the dark current correction coefficient of R pixels 325 and 326 adjacent to a phase difference detection pixel 322.

The amount of generated dark current of the image generation pixels adjacent to the phase difference detection pixels (correction target pixels) is different from the amount of generated dark current of the image generation pixels not adjacent to the phase difference detection pixels (normal pixels) due to slight distortion of the configuration affected by high density of metal layers in the phase difference detection pixels. Thus, it is necessary to perform correction of dark current different from the correction of dark current of the normal pixels resulting from subtraction of an average value of the dark current of the normal pixels in the image generation pixel dark current measuring area 222.

The amount of generated dark current increases depending on a change in temperature or the length of exposure time if the temperature of the imaging element 200 changes or the time of being exposed to light is lengthened. In addition, the amount of generated dark current of pixels in the image generation pixel dark current measuring area 222 and the amount of generated dark current of the correction target pixels are correlated (in the proportional relationship). For this reason, in the correction coefficient calculation operation, a value (dark current correction coefficient) can be calculated which indicates the relationship between the average value of the amount of generated dark current of the normal pixels in the image generation pixel dark current measuring area 222 and the amount of generated dark current of the correction target pixels using an image captured in a state without light (all black image).

Calculation of a dark current correction coefficient ($S_{R325}$) of the R pixel 325 shown in FIG. 6A is calculated, for example, using the following Formula 1.

$$S_{R325} = I_{R325(BK)} / \text{Iave}_{dknR(BK)} \quad \text{Formula 1}$$

Herein, $I_{R325(BK)}$ is a value (luminance value) of the signal of the R pixel 325 in the all black image (BK), and is so-called dark current of the R pixel 325. In addition, $\text{Iave}_{dknR(BK)}$ is an average value of the luminance value of the normal R pixel in the image generation pixel dark current measuring area 222 in the all black image.

The dark current correction coefficient is calculated for each of the image generation pixels adjacent to the phase difference detection pixels in the light sensing pixel area 210 of the imaging element 200. For example, a dark current correction coefficient ($S_{R326}$) of an R pixel 326 is calculated by the following Formula 2 in which $I_{R325(BK)}$ of Formula 1 is set to a luminance value ($I_{R326(BK)}$) of the R pixel 326 in the all black image.

$$S_{R326} = I_{R326(BK)} / \text{Iave}_{dknR(BK)} \quad \text{Formula 2}$$

In FIG. 6B, Gr pixels 345 and 346 adjacent to a phase difference detection pixel 342 are shown. Calculation of a dark current correction coefficient ($S_{Gr345}$) of the Gr pixel 345 is calculated using the following Formula 3, in the same manner as in the case of the R pixel 325 by Formula 1.

$$S_{Gr345} = I_{Gr345(BK)} / \text{Iave}_{dknGr(BK)} \quad \text{Formula 3}$$

Herein, $I_{Gr345(BK)}$ is a luminance value of the Gr pixel 345 in the all black image. In addition, $\text{Iave}_{dknGr(BK)}$ is an average value of the luminance value of the normal Gr pixel in the image generation pixel dark current measuring area 222 in the all black image.

In addition, a dark current correction coefficient ($S_{Gr346}$) of a Gr pixel 346 is calculated by setting the luminance value ($I_{Gr345(BK)}$) of Formula 3 to a luminance value $I_{Gr346(BK)}$) of the Gr pixel 346 in the all black image.

As such, in the correction coefficient calculation operation, the correction coefficient calculation unit 300 calculates dark current correction coefficients for each image generation pixel adjacent to the phase difference detection pixels. Furthermore, such a dark current correction coefficient is calculated by formulas of which the numerator is a luminance value of the calculation target pixel of the dark current correction coefficient in the all black image and the denominator is an average value of the amount of generated dark current of the normal pixels in the image generation pixel dark current measuring area 222 in the all black image, as shown in Formulas 1 to 3.

Next, calculation of color mixture correction coefficient will be described with reference to FIGS. 7A to 11B.

[One Example of Color Mixture-Derived Light in Image Generation Pixel adjacent to Phase Difference Detection Pixel]

Figure 7A:
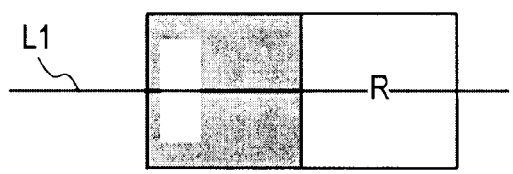
FIGS. 7A and 7B are schematic diagrams schematically showing color mixture-derived light attributable to color mixture in image generation pixels adjacent to phase difference detection pixels in the first embodiment of the disclosure.
Figure 7B:
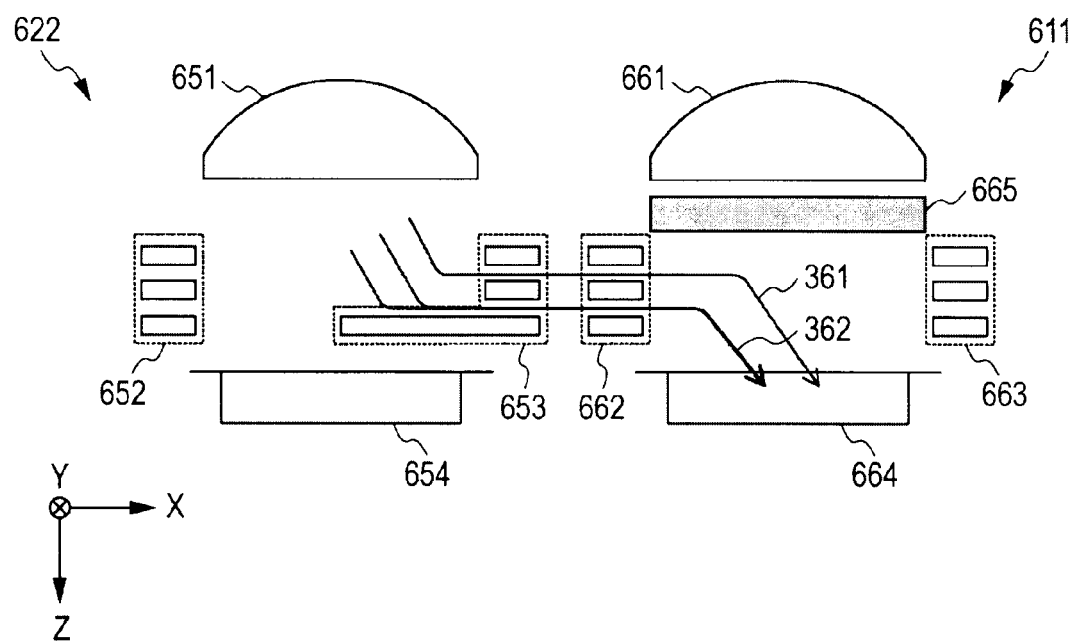

FIGS. 7A and 7B are schematic diagrams schematically showing color mixture-derived light attributable to color mixture in the image generation pixels adjacent to the phase difference detection pixels in the first embodiment of the disclosure.

Furthermore, in the same drawings, description will be provided assuming an arrangement in which a phase difference detection pixel of which the right side is shielded from light and the left side is an opening part and an R pixel are adjacent in the right and left (the phase difference detection pixel is in the left and the R pixel is in the right), as shown in FIG. 7A. In other words, an arrangement is assumed where a phase difference detection pixel 622 and an R pixel 611 are adjacent in the left and right in the imaging element 200.

In FIG. 7B, a cross-sectional configuration of a line L1 shown in FIG. 7A is shown. In FIG. 7B, as a cross-sectional configuration of a phase difference detection pixel 622, a micro-lens 651, a wiring 652, a wiring 653, and a light sensing element 654 are shown. In addition, as a cross-sectional configuration of an R pixel 611, a micro-lens 661, a wiring 662, a wiring 663, a light sensing element 664, and an R filter 665 are shown. In addition, in FIG. 7B, arrows 361 and 362 are shown which schematically indicates light leaked from the phase difference detection pixel 622, to the R pixel 611. Furthermore, the phase difference detection pixel 622 is assumed not to include a color filter.

The micro-lens 651 is a lens for converging subject light to the light sensing element 654.

Wirings 652 and 653 are wirings for connecting each circuit in the phase difference detection pixel 622. In FIG. 7B, the wirings 652 and 653 are showing in which three wires are arranged in a layer shape for the optical axis.

The wiring 653 includes one wire projecting to the vicinity of the center of the light sensing element 654. The projection is formed so as to cover the right half of the light sensing element 654 between the light sensing element 654 and the micro-lens 651, and shields subject light passing through the left half of the exit pupil. On the other hand, the wiring 652 is not arranged on the optical path of subject light from the micro-lens 651 to the light sensing element 654, but arranged in the periphery of the optical path. Furthermore, the wirings 652 and 653 also play a role of shielding light from adjacent pixels.

The light sensing element 654 generates electrical signals with strength according to the amount of received light by converting the received light to electrical signals (photoelectric conversion). The light sensing element 654 is constituted by, for example, a photodiode (PD).

A micro-lens 661 of an R pixel 611 is a lens for converging subject light to the light sensing element 664, in the same manner as the micro-lens 651 of the phase difference detection pixel 622. In addition, since the light sensing elements 664 and 654 are similar, description thereof will not be repeated.

Wirings 662 and 663 are wirings for connecting each circuit in the R pixel 611. Furthermore, the wirings 662 and 663 are not arranged on the optical path of the subject light from the micro-lens 661 to the light sensing element 664, but arranged in the periphery of the optical path.

An R filter 665 is a color filter through which red(R) light penetrates.

Herein, light leaked from the phase difference detection pixel 622 to the R pixel 611 (color mixture-derived light) will be described using the arrows 361 and 362.

As schematically shown by the arrows 361 and 362, the subject light wandering between the wirings advances while being multiple-reflected between the adjacent pixels, whereby a little light is sensed on the light sensing element of an adjacent pixel. Since a phase difference detection pixel includes a color filter through which light of a specific wavelength penetrates and light of another wavelength is absorbed (including a case where a white color filter through which the entire light in the visible spectrum penetrates is included therein), the phase difference detection pixel has a larger amount of incident light than an image generation pixel has. Due to the increase in the amount of incident light, the amount of color mixture-derived light to the image generation pixels adjacent to the phase difference detection pixels relatively increases.

In addition, in the phase difference detection pixels, there is a side including a large wiring serving as a light shielding layer (the wiring 653 side in the phase difference detection pixel 622 of FIG. 7B). Since the large wiring serving as a light shielding layer reflects light, the amount of color mixture-derived light to the pixel adjacent to the large wiring (the R pixel 611 of FIG. 7B) is larger than that of the image generation pixel adjacent to the side without a wiring serving as a light shielding layer (the side of the wiring 652).

According to the above, the amount of color mixture-derived light of the image generation pixels adjacent to the phase difference detection pixels is larger than that of color mixture-derived light of the image generation pixels not adjacent to the phase difference detection pixels.

[Detection Example of Color Mixture-Derived Light of R Pixel Adjacent to Phase Difference Detection Pixel]

Figure 8:
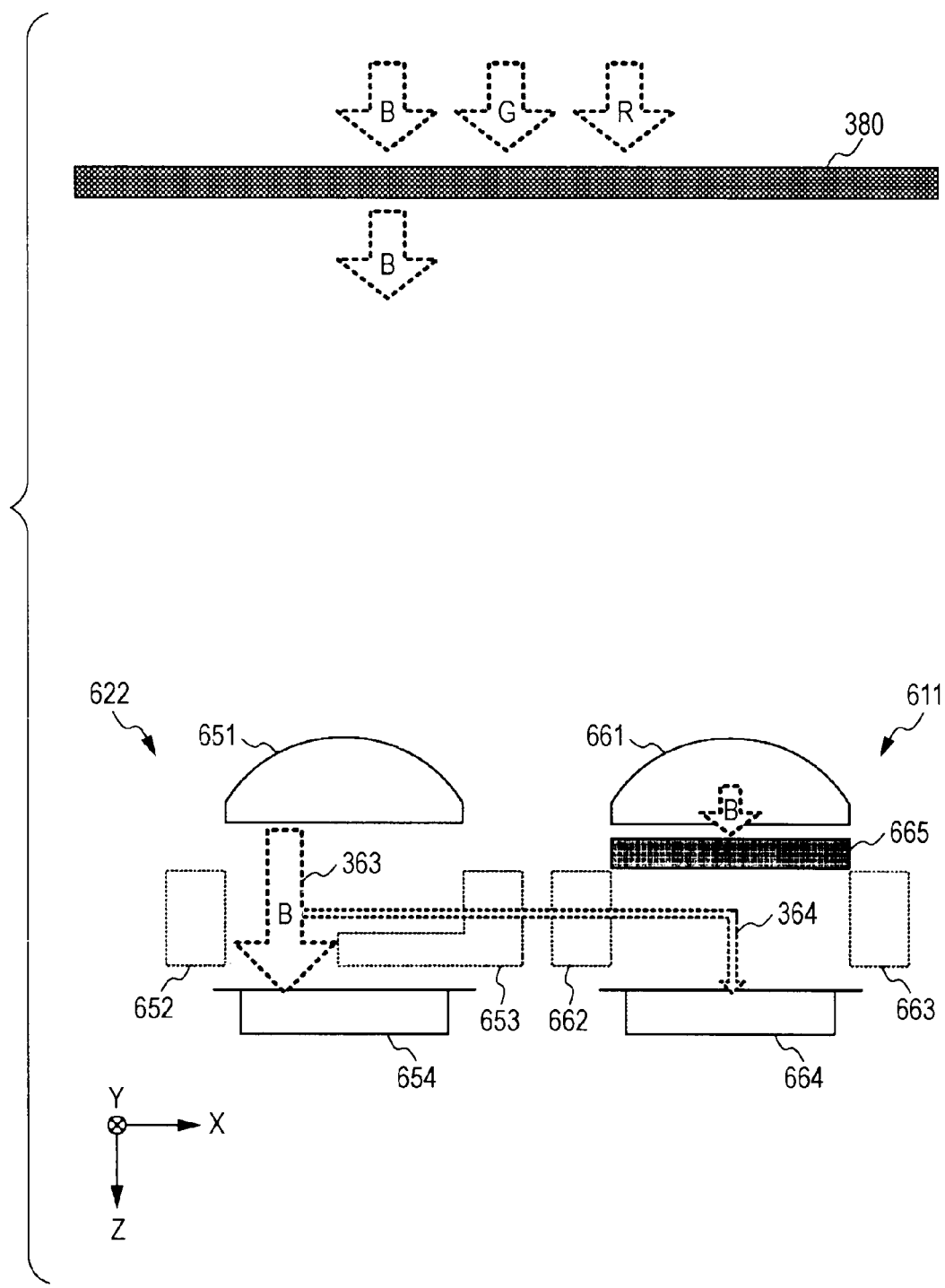
FIG. 8 is a schematic diagram showing an example of detection of color mixture-derived light of an R pixel adjacent to the phase difference detection pixel in the first embodiment of the disclosure.

FIG. 8 is a schematic diagram showing an example of detection of the color mixture-derived light of the R pixel adjacent to the phase difference detection pixel in the first embodiment of the disclosure.

In the drawing, the cross-sectional view of the phase difference detection pixel 622 and the R pixel 611 shown in FIG. 7B and a cross-sectional view of a filter for penetrating only blue light (B filter 380) in the imaging element 200 are shown.

In addition, the passing state of blue light is schematically shown by a dotted arrow with B. In the same manner, the passing state of green light is schematically shown by a dotted arrow with G, and the passing state of red light is schematically shown by a dotted arrow with R.

Herein, with regard to a detection method of color mixture-derived light of the R pixel adjacent to the phase difference detection pixel in the correction coefficient calculation operation, description will be provided using the phase difference detection pixel 622 and the R pixel 611.

The color filter of the R pixel 611 (R filter 665) causes light of red wavelength to penetrate therethrough but absorbs light of other wavelengths. In addition, since the phase difference detection pixel 622 does not include a color filter, the phase difference detection pixel causes light of all wavelengths in light converged by the micro-lens 651 to penetrate therethrough to the light sensing element 654 side. In other words, by removing the light of red wavelength from the subject light, it is possible to sense only the color mixture-derived light on the light sensing element of the R pixel.

In the drawing, an example is shown in which an image is captured for calculating the color mixture correction coefficient of the R pixel adjacent to the phase difference detection pixel by inserting a B filter 380 through which only blue light penetrates between the light source and the imaging element 200, in order to remove the light of red wavelength from the subject light.

As shown in the drawing, by capturing an image using the B filter 380, light penetrating the right side of the exit pupil in the blue light (arrow 363) is sensed on the light sensing element 654 in the phase difference detection pixel 622. On the other hand, the R pixel 611 is in a state where light penetrating the R filter 665 does not exist therein. In the R pixel 611, however, the blue light (arrow 364) leaked from the phase difference detection pixel 622 is sensed on the light sensing element 664.

[Calculation Example of Color Mixture Correction Coefficient of R pixel by Correction Coefficient Calculation Unit]

FIGS. 9A and 9B are diagrams showing the pixel arrangement of the imaging element 200 for illustrating calculation of the color mixture correction coefficient of the R pixel in the first embodiment of the disclosure.

The color mixture correction coefficient of the R pixel adjacent to the phase difference detection pixel is calculated from an image captured using the B filter 380 (blue filter image) in the correction coefficient calculation operation as shown in FIG. 8. In the calculation of the color mixture correction coefficient, first, a value resulting from light leaked from the phase difference detection pixel among luminance values of the R pixel of the calculation target (correction target R pixel) (color mixture amount) is calculated. Subsequently, a color mixture correction coefficient is calculated based on the relationship between the calculated color mixture amount and the amount of leaked light assumed based on the amount of sensed light of the adjacent phase difference detection pixels. Thus, calculation of the amount of color mixture will be described in FIG. 9A and calculation of the color mixture correction coefficient will be described in FIG. 9B.

Furthermore, when a captured image is generated using the B filter 380, it is assumed that light penetrating the entire imaging element 200 has uniform wavelength and intensity (without unevenness). In addition, the amount of light of the light source is assumed to be the amount in which a bright image can be captured in a short period of time even using the B filter 380, and the image is assumed to be captured using the B filter 380 in a state where the occurrence of dark current can be ignored.

In FIG. 9A, pixel arrangement is shown for illustrating the calculation of color mixture of the correction target R pixel. Furthermore, the pixel arrangement is the same as three columns including the R pixel of the area 212 shown in FIG. 5. In FIG. 9A, the calculation of the color mixture amount will be described focusing on the correction target R pixel adjacent to the phase difference detection pixels 321 and 323 (R pixels 325 and 326) and the normal R pixels (R pixels 324 and 327).

The color mixture amount of the R pixel 325 in the captured image using the B filter 380 ($E_{R325(B)}$) is calculated by subtracting the luminance value of the R pixel that is not the correction target from the luminance value of the R pixel 325 that is the calculation target (correction target) of the color mixture correction coefficient. With the subtraction, it is possible to obtain the color mixture amount caused by light leaked from the adjacent phase difference detection pixels. The color mixture amount of the R pixel 325 ($E_{R325(B)}$) is calculated using, for example, the following Formula 4.

$$E_{R325(B)} = I_{R325(B)} - (I_{R324(B)} + I_{R327(B)})/2 \qquad \text{Formula 4}$$

Herein, $I_{R325(B)}$ is a value (luminance value) of the signal of an R pixel 325 in the image (B) captured using the B filter 380. In the same manner, $I_{R324(B)}$ is the luminance value of an R pixel 324 in the image captured using the B filter 380, and $I_{R327(B)}$ is the luminance value of an R pixel 327 of the same image. In other words, $(I_{R324(B)} + I_{R327(B)})/2$ of Formula 4 is for calculating the average value of the luminance values of the R pixels which are not the correction targets (normal R pixels). Furthermore, as the normal R pixels used for obtaining the color mixture amount, normal R pixels are desirable which are arranged in positions close to the R pixels which are the targets for calculating the color mixture amount, in order to avoid other influences on the luminance values.

The color mixture amount is calculated for each of the image generation pixels adjacent to the phase difference detection pixels in the light sensing pixel area 210. For example, the color mixture amount of the R pixel 326 ($E_{R326(B)}$) is calculated in the same manner as the color mixture amount ($E_{R325(B)}$) using the luminance value of the R pixel 325 ($I_{R326(B)}$). The color mixture amount of the R pixel 326 ($E_{R326(B)}$) is calculated using Formula 5.

$$E_{R326(B)} = I_{R326(B)} - (I_{R324(B)} + I_{R327(B)})/2 \qquad \text{Formula 5}$$

In FIG. 9B, pixel arrangement is shown for illustrating the calculation of the color mixture correction coefficient of the correction target R pixel. In FIG. 9B, the phase difference detection pixels 321 to 323 shown in FIG. 9A and the R pixels 325 and 326 are shown. In addition, the arrows (arrows 331 to 333) indicating color mixture-derived light from each of the phase difference detection pixels 321 to 323 to the R pixel 325 and the arrows (arrows 334 to 336) indicating color mixture-derived light from each of the phase difference detection pixels 321 to 323 to the R pixel 326 are shown.

The color mixture amount ($E_{R325)B)}$) of the R pixel 325 in the image captured using the B filter 380 has a large value as the amount of light (color mixture-derived light) leaked from each of the adjacent phase difference detection pixels (phase difference detection pixels 321 to 323) becomes large. In addition, the amount of light leaked from each of the phase difference detection pixels 321 to 323 becomes large as the amount of sensed light in the phase difference detection pixels 321 to 323 becomes great. In other words, the color mixture amount ($E_{R325(B)}$) and the amount of sensed light (luminance value) of the phase difference detection pixels 321 to 323 are correlated.

Thus, a color mixture correction coefficient is calculated based on the correlation (proportional relationship) between the luminance value of the phase difference detection pixels 321 to 323 and the color mixture amount ($E_{R325(B)}$) of the R pixel 325. The color mixture correction coefficient ($T_{R325}$) of the R pixel 325 is calculated using, for example, the following Formula 6.

$$T_{R325} = E_{R325(B)}/(Wru_{D321} \times I_{D321(B)} + Wcu_{D322} \times I_{D322(B)} + Wlu_{D323} \times I_{D323(B)}) \quad \text{Formula 6}$$

Herein, $Wru_{D321}$ is a coefficient (light amount calculation coefficient (upper right)) for assuming the amount of light leaked from the phase difference detection pixel 321 (D321) to the R pixel 325 positioned upper-right side thereof based on a value (luminance value) of the signal of the phase difference detection pixel 321. In the same manner, $Wcu_{D322}$ is a coefficient (light amount calculation coefficient (immediately upper)) for assuming the amount of light leaked from the phase difference detection pixel 322 (D322) to the R pixel 325 positioned immediately upper side thereof based on the amount of sensed light of the phase difference detection pixel 322. In addition, $Wlu_{D323}$ is a coefficient (light amount calculation coefficient (upper left)) for assuming the amount of light leaked from the phase difference detection pixel 323 (D323) to the R pixel 325 positioned upper-left side thereof based on the amount of sensed light of the phase difference detection pixel 323.

In addition, $I_{D321(B)}$ is a value (luminance value) of the signal of the phase difference detection pixel 321 (D321). In the same manner, $I_{D322(B)}$ is a luminance value of the phase difference detection pixel 322 (D322), and $I_{D323(B)}$ is a luminance value of the phase difference detection pixel 323 (D323).

In other words, the denominator of the left side of Formula 6 is for calculating a value indicating the amount of light leaked from the phase difference detection pixels 321 to 323 to the R pixel 325.

The color mixture correction coefficient is calculated for each of the image generation pixels adjacent to the phase difference detection pixels in the light sensing pixel area 210. For example, the color mixture correction coefficient ($T_{R326}$) of the R pixel 326 is calculated using the following Formula 7, in the same manner as the color mixture correction coefficient ($T_{R325}$) of the R pixel 325.

$$T_{R326} = E_{R326(B)}/(Wrs_{D321} \times I_{D321(B)} + Wcs_{D322} \times I_{D322(B)} + Wls_{D323} \times I_{D323(B)}) \quad \text{Formula 7}$$

Herein, $Wrs_{D321}$ is a coefficient (light amount calculation coefficient (lower right)) for assuming the amount of light leaked from the phase difference detection pixel 321 (D321) to the R pixel 326 positioned in the lower-right side thereof based on the amount of sensed light of the phase difference detection pixel 321. In the same manner, $Wcs_{D322}$ is a coefficient (light amount calculation coefficient(immediately lower)) for assuming the amount of light leaked from the phase difference detection pixel 322 (D322) to the R pixel 326 positioned in the immediately lower side thereof based on the amount of sensed light of the phase difference detection pixel 322. In addition, $Wls_{D323}$ is a coefficient (light amount calculation coefficient(lower left)) for assuming the amount of light leaked from the phase difference detection pixel 323 (D323) to the R pixel 326 positioned in the lower-left side thereof based on the amount of sensed light of the phase difference detection pixel 323.

Such light amount calculation coefficients are coefficients for each image generation pixel as correction targets, and determined for each image generation pixel as correction targets in the stages of design and trial production of the imaging element, and the determined value is recorded on the FlashROM 500.

As such, a color mixture correction coefficient of a correction target R pixel is calculated by using the blue filter image.

Next, calculation of a color mixture correction coefficient of a Gr pixel adjacent to the phase difference correction pixels will be described with reference to FIGS. 10 to 11B.

[Detection Example of Color Mixture-Derived Light of Gr Pixel Adjacent to Phase Difference Detection Pixels]

Figure 10:
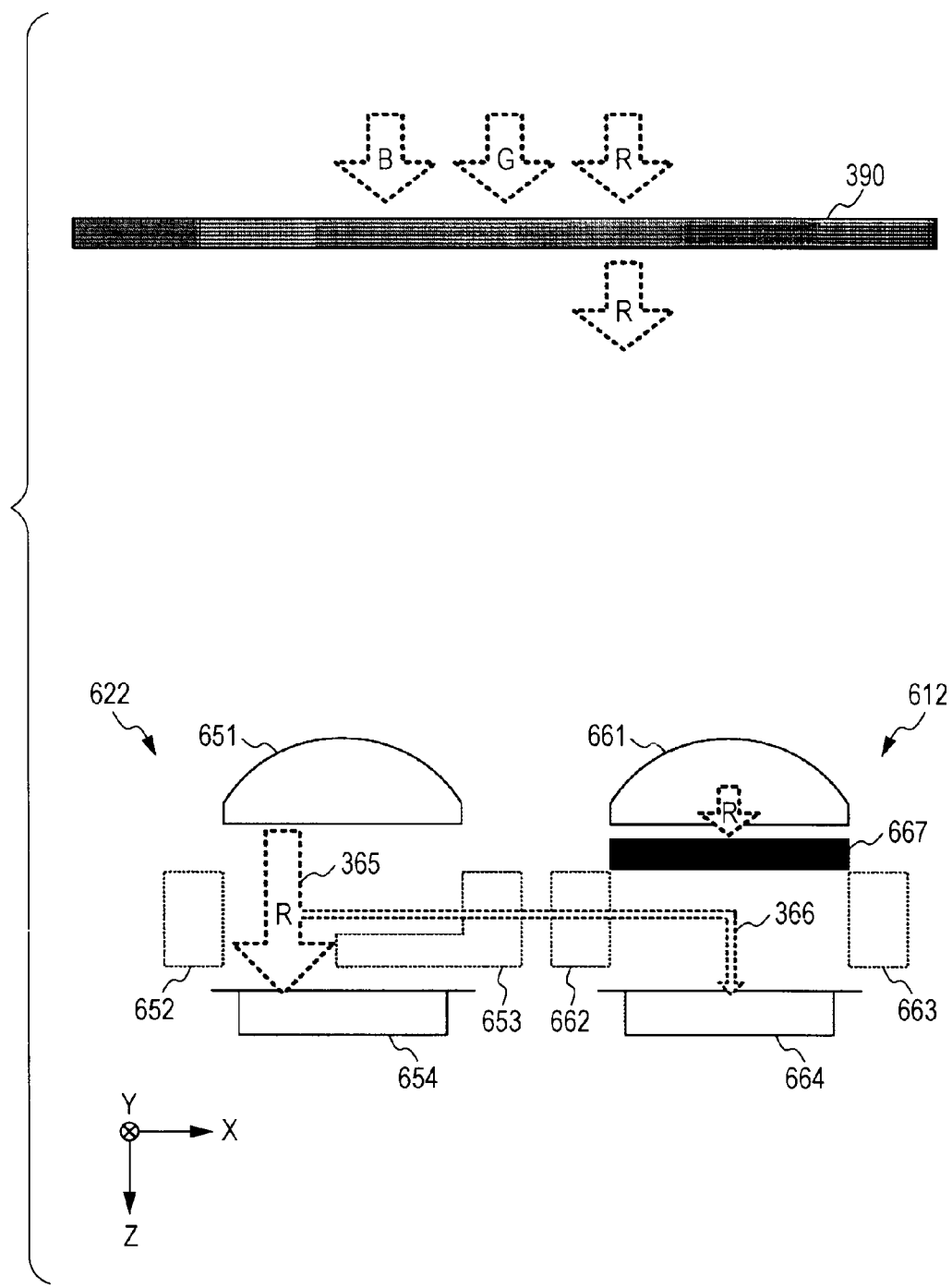
FIG. 10 is a schematic diagram showing an example of detection of color mixture-derived light of a Gr pixel adjacent to a phase difference detection pixels in the first embodiment of the disclosure.

FIG. 10 is a schematic diagram showing an example of detection of the color mixture-derived light of a Gr pixel adjacent to a phase difference detection pixels in the first embodiment of the disclosure.

The drawing corresponds to the detection of color mixture-derived light of the R pixel shown in FIG. 8. For this reason, differences between the detection of color mixture-derived light of the Gr pixel and detection of color mixture-derived light of the R pixel will be mainly described herein.

In the drawing, a filter (R filter 390) for penetrating only red light to the imaging element 200 is shown instead of the B filter 380 shown in FIG. 8. Green light can be removed from subject light with the R filter 390. Accordingly, it is possible to sense only color mixture-derived light on the light sensing element 664 of the Gr pixel 612.

As shown in the drawing, by capturing an image using the R filter 390, light passing through the right side of the exit pupil out of red light (arrow 365) is sensed on the light sensing element 654 in the phase difference detection pixel 622. On the other hand, the Gr pixel 612 is in a state where light penetrating a G filter 667 does not exist therein. In the Gr pixel 612, however, red light (arrow 366) leaked from the phase difference detection pixel 622 is sensed on the light sensing element 664.

[Calculation Example of Color Mixture Correction Coefficient by Correction Coefficient Calculation Unit]

Figure 11A:
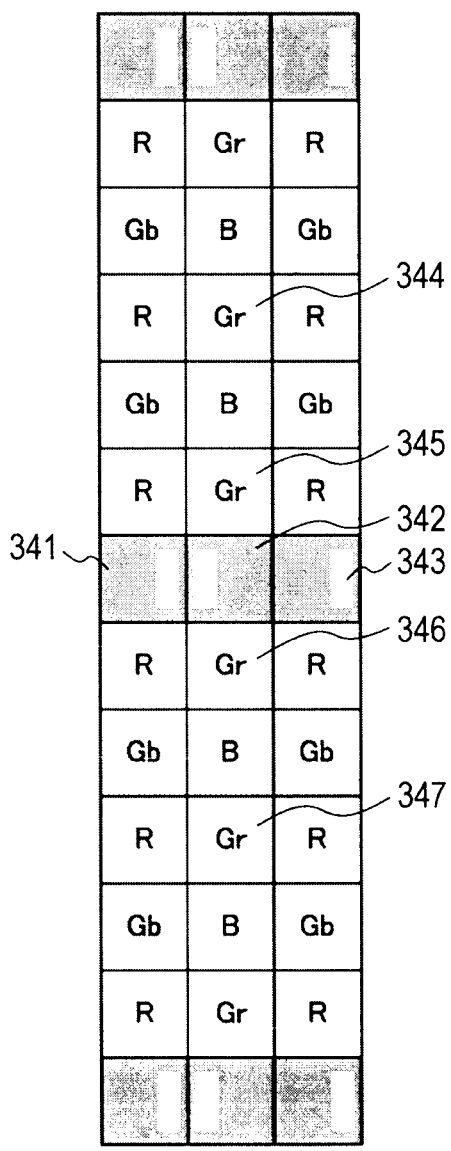
FIGS. 11A and 11B are diagrams showing the pixel arrangement of the imaging element for illustrating calculation of a color mixture correction coefficient of the Gr pixel in the first embodiment of the disclosure.
Figure 11B:
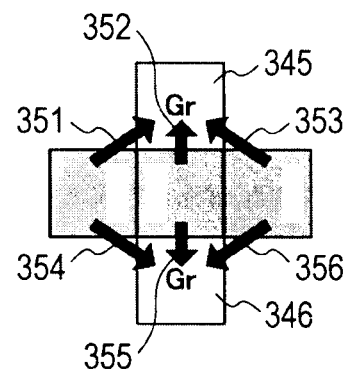

FIGS. 11A and 11B are diagrams showing the pixel arrangement of the imaging element 200 for illustrating calculation of a color mixture correction coefficient of the Gr pixel in the first embodiment of the disclosure.

The drawing corresponds to the detection of the color mixture-derived light of the R pixel shown in FIGS. 9A and 9B. For this reason, the same point of the calculation of the color mixture correction coefficient of the Gr pixel as the calculation of the color mixture correction coefficient of the R pixel will be described herein.

The calculation of the color mixture correction coefficient of the Gr pixel is performed by calculating the amount of color mixture caused by light leaked from the adjacent phase difference detection pixel, and then calculating a color mixture correction coefficient of the Gr pixel as calculation target (correction target Gr pixel) based on the calculated amount of color mixture, in the same manner as the calculation of the color mixture correction coefficient of the R pixel.

The amount of color mixture of the Gr pixel 345 ($E_{Gr345(R)}$) is calculated using, for example, the following Formula 8.

$$E_{Gr345(R)} = I_{Gr345(R)} - (I_{Gr344(R)} + I_{Gr347(R)})/2 \quad \text{Formula 8}$$

Furthermore, the amount of color mixture of the Gr pixel 346 ($E_{Gr346(R)}$) is calculated using, for example, the following Formula 9.

$$E_{Gr346(R)} = I_{Gr346(R)} - (I_{Gr344(R)} + I_{Gr347(R)})/2 \quad \text{Formula 9}$$

In addition, the color mixture correction coefficient of the Gr pixel 345 ($T_{Gr345}$) is calculated using the following Formula 10, and the color mixture correction coefficient of the Gr pixel 346 ($T_{Gr346}$) is calculated using the following Formula 11.

$$T_{Gr345} = E_{Gr345(R)}/(Wru_{D341} \times I_{D341(R)} + Wcu_{D342} \times I_{D342(R)} + Wls_{D343} \times I_{D343(R)}) \quad \text{Formula 10}$$

$$T_{Gr346} = E_{Gr346(R)}/(Wrs_{D341} \times I_{D341(R)} + Wcs_{D342} \times I_{D342(R)} + Wls_{D343} \times I_{D343(R)}) \quad \text{Formula 11}$$

Herein, $I_{Gr344(R)}$ to $I_{Gr347(R)}$ are luminance values of the Gr pixel 344 to the Gr pixel 347 in the image (R) captured using the R filter 390. In addition, $I_{D341(R)}$ to $I_{D343(R)}$ are luminance values of the phase difference detection pixel 341 to the Gr pixel 343 in the image (R) captured using the R filter 390. In addition, $Wru_{D341}$, $Wcu_{D342}$, and $Wlu_{D343}$ are light amount calculation coefficients for the Gr pixel 345 in three phase difference detection pixels (D341 to D343) adjacent to the Gr pixel 345. In addition, $Wrs_{D341}$, $Wcs_{D342}$, and $Wls_{D343}$ are light amount calculation coefficients for the Gr pixel 346 in three phase difference detection pixels (D341 to D343) adjacent to the Gr pixel 346.

As such, the color mixture correction coefficients are calculated for each correction target pixel, and the calculated color mixture correction coefficients are recorded on the FlashROM 500. In addition, the light amount calculation coefficients are also respectively determined for each correction target pixel before the color mixture correction coefficients are calculated, and the determined light amount calculation coefficients are recorded on the FlashROM 500.

Next, calculation of a sensitivity correction coefficient of an image generation pixel adjacent to phase difference detection pixels (R pixel and Gr pixel) will be described with reference to FIG. 12.

[Calculation Example of Sensitivity Correction Coefficient by Correction Coefficient Calculation Unit]

FIG. 12 is a diagram showing the pixel arrangement of the imaging element 200 for illustrating calculation of a sensitivity correction coefficient of an R pixel in the first embodiment of the disclosure.

In the drawing, first, a difference in sensitivity occurring between an R pixel adjacent to phase difference detection pixels and an R pixel not adjacent thereto will be described. Herein, an example will be described in which a sensitivity difference occurs due to a difference between the amount of light which is incident to the micro-lens of the R pixel adjacent to the phase difference detection pixels and sensed on the light sensing element and the amount of light which is incident to the micro-lens of the R pixel not adjacent thereto and sensed on the light sensing element. As this example, description will be provided assuming that the sensitivity difference occurs when the thickness of a penetration layer between the color filter of the R pixel adjacent to the phase difference detection pixels and wiring is slightly thicker than that of the penetration layer between the color filter of the R pixel not adjacent to the phase difference detection pixels and wiring.

In the drawing, the cross-sectional configurations of the R pixel 325 and the R pixel 324 shown in FIG. 9A are shown. In FIG. 12, in regard to the thickness of the penetration layers between the color filters and wirings, the difference between the thickness of the R pixel 325 (arrow 675) and the thickness of the R pixel 324 (arrow 676) is shown. In addition, in the drawing, the amount of light sensed by the light sensing element 654 of the R pixel 325 is schematically shown by an arrow 677, and the amount of light sensed by the light sensing element 654 of the R pixel 324 is schematically shown by an arrow 678. Furthermore, the arrow 678 is shown by a greater arrow than the arrow 677, thereby indicating that the amount of light sensed by the light sensing element 654 of the R pixel 324 is greater than the amount of light sensed by the light sensing element 654 of the R pixel 325.

Herein, the objective of correction by a sensitivity correction coefficient will be described.

In the course of manufacturing the imaging element 200, if a configuration such that only the portion of phase difference detection pixels is different is adopted, the adoption also affects the configuration of pixels adjacent thereto. For example, let us assume that a layer of a color filter (transparent layer) is formed for a phase difference detection pixel before an R filter of an R pixel is formed. In this case, a slight change occurs in the configuration of pixels adjacent to the phase difference detection pixels being affected by the formation of the transparent layer (for example, the transparent layer before a color filter becomes thick). Accordingly, a difference occurs in the amount of light lost from the incidence thereof to the micro-lens to the sensing on the light sensing element between the pixels adjacent to the phase difference detection pixels and pixels not adjacent thereto. In the image generation pixels not adjacent to the phase difference detection pixels, since pixels adjacent to each of the image generation pixels are the same, such a difference in the configurations does not occur. In other words, the difference between the configurations occurs only between the image generation pixels adjacent to the phase difference detection pixels and the image generation pixels not adjacent thereto.

As such, a difference occurs in the amount of light lost from the incidence of the light to the micro-lens to the sensing on the light sensing element between the image generation pixels adjacent to the phase difference detection pixels (R pixel 325) and the image generation pixels not adjacent thereto (R pixel 324). In other words, as shown by the arrows 677 and 678 of FIG. 12, even if the amount of light incident to the micro-lenses are the same, a difference occurs in the amount of light which is incident to the micro-lenses and sensed on the light sensing element (sensitivity difference).

Next, the calculation of the sensitivity correction coefficient will be described. In order to calculate the sensitivity correction coefficient, uniform light is irradiated on the entire imaging element 200 to capture an image used in the calculation of the sensitivity correction coefficient. In other words, since both the sensitivity correction coefficient of the R pixel and the sensitivity correction coefficient of the Gr pixel are calculated using the image, a light source is desirable, which has the same intensity over the overall wavelengths.

The calculation of the sensitivity correction coefficient is performed, first, by subtracting the amount of color mixture from the luminance value of the correction target pixel, and calculating a luminance value excluding the influence of color mixture (luminance value after color mixture correction). Then, the sensitivity correction coefficient is calculated based on the correlation (proportional relationship) between the luminance value from which the amount of color mixture is subtracted and the luminance value of a normal pixel.

The luminance value after color mixture correction of the R pixel 325 ($F_{R325}$) is calculated using, for example, the following Formula 12. In addition, the sensitivity correction coefficient of the R pixel 325 ($U_{R325}$) is calculated using, for example, the following Formula 13.

$$F_{R325} = I_{R325(W)} - T_{R325} \times (Wru_{D321} \times I_{D321(W)} + Wcu_{D322} \times I_{D322(W)} + Wlu_{D323} \times I_{D323(W)}) \quad \text{Formula 13}$$

$$U_{R325} = ((I_{R324(W)} + I_{R327(W)})/2)/F_{R325} \quad \text{Formula 14}$$

Herein, $I_{R325(W)}$ is the luminance value of the R pixel 325 in a white image (W). In the same manner, $I_{D321(W)}$, $I_{D322(W)}$, and $I_{D323(W)}$ are the luminance values of each of the phase difference detection pixels 321, 322, and 323 in the white image (W). In addition, $I_{R324}$ and $I_{R327(W)}$ are the luminance values of the R pixels 324 and 327 in the white image (W).

In Formula 13, a luminance value (the amount of color mixture) by color mixture included in the luminance value of the R pixel 325 in the white image (W) is calculated with $T_{R325} \times (Wru_{D321} \times I_{D321(W)} + Wcu_{D322} \times I_{D322(W)} \times Wlu_{D323(W)})$. In other words, in Formula 13, the luminance value after color mixture correction ($F_{R325}$) is calculated by subtracting the amount of color mixture from the luminance value of the R pixel 325 in the white image (W) ($I_{R325(W)}$).

In Formula 14, the sensitivity correction coefficient ($U_{R325}$) is calculated based on the correlation (proportional relationship) between the luminance value after color mixture correction ($F_{R325}$) and the luminance value of the normal pixel.

The sensitivity correction coefficient is calculated for each of the correction target pixels in the light sensing pixel area 210. The sensitivity correction coefficient ($U_{R326}$) of the R pixel 326 is calculated using, for example, the following formulas 15 and 16. In addition, the sensitivity correction coefficient ($U_{Gr345}$) of the Gr pixel 345 is calculated using the following formulas 17 and 18, and the sensitivity correction coefficient ($U_{Gr346}$) of the Gr pixel 346 is calculated using the following formulas 19 and 20.

$$F_{R326} = I_{R326(W)} - T_{R326} \times (Wrs_{D321} \times I_{D321(W)} + Wcs_{D322} \times I_{D322(W)} + Wls_{D323} \times I_{D323(W)}) \quad \text{Formula 15}$$

$$U_{R326} = ((I_{R324(W)} + I_{R327(W)})/2)/F_{R326} \quad \text{Formula 16}$$

$$F_{Gr345} = I_{Gr345(W)} - T_{Gr345} \times (Wru_{D321} \times I_{D341(W)} + Wcu_{D322} \times I_{D322(W)} + Wlu_{D323} \times I_{D323(W)}) \quad \text{Formula 17}$$

$$U_{Gr345} = ((I_{Gr344(W)} + I_{Gr347(W)})/2)/F_{Gr345} \quad \text{Formula 18}$$

$$F_{Gr346} = I_{Gr346(W)} - T_{Gr346} \times (Wrs_{D341} \times I_{D341(W)} + Wcs_{D342} \times I_{D342(W)} + Wls_{D343} \times I_{D343(W)}) \quad \text{Formula 19}$$

$$U_{Gr346} = ((I_{Gr344(W)} + I_{Gr347(W)})/2)/F_{Gr346} \quad \text{Formula 20}$$

As such, a sensitivity correction coefficient is calculated for each correction target pixel, and the calculated sensitivity correction coefficient is recorded on the FlashROM 500.

[Operation Example of Imaging Device in Correction Coefficient Calculation Operation]

Next, the operation of the imaging device 100 in the correction coefficient calculation operation of the first embodiment of the disclosure will be described with reference to drawings.

Figure 13:
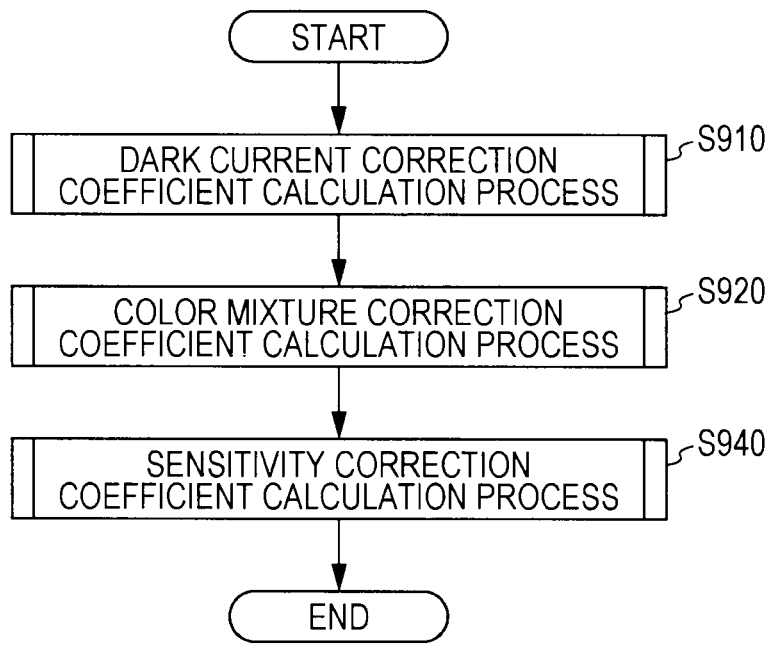
FIG. 13 is a flowchart showing an example of the procedure of a correction coefficient calculation process by the imaging device in the correction coefficient calculation operation in the first embodiment of the disclosure.

FIG. 13 is a flowchart showing an example of the procedure of the correction coefficient calculation process by the imaging device 100 in the correction coefficient calculation operation in the first embodiment of the disclosure. The procedure of the correction coefficient calculation process is executed in the process of calculating correction coefficients in the course of manufacturing the imaging device 100.

First, a dark current correction coefficient calculation process for calculating a coefficient (dark current correction coefficient) for correcting dark current of an image generation pixels adjacent to a phase difference detection pixels (correction target pixels) is performed (Step S910). Furthermore, the dark current correction coefficient calculation process (Step S910) will be described with reference to FIG. 14.

Subsequently, a color mixture amount correction coefficient calculation process for calculating a coefficient (color mixture amount correction coefficient) for correcting the color mixture (a change in luminance caused by light leaked from a phase difference detection pixel) in the correction target pixel is performed (Step S920). Furthermore, the color mixture amount correction coefficient calculation process (Step S920) will be described with reference to FIG. 15.

In addition, a sensitivity correction coefficient calculation process for calculating a coefficient (sensitivity correction coefficient) for correcting a difference in sensitivity (a difference in the amount of light which is incident to a micro-lens and sensed on a light sensing element) between the correction target pixel and a normal pixel is performed (Step S940). Furthermore, the sensitivity correction coefficient calculation process (Step S940) will be described with reference to FIG. 16.

When the dark current correction coefficient calculation process (Step S910), the color mixture amount correction coefficient calculation process (Step S920), and the sensitivity correction coefficient calculation process (Step S940) end, the procedure of the correction coefficient calculation process ends.

Figure 14:
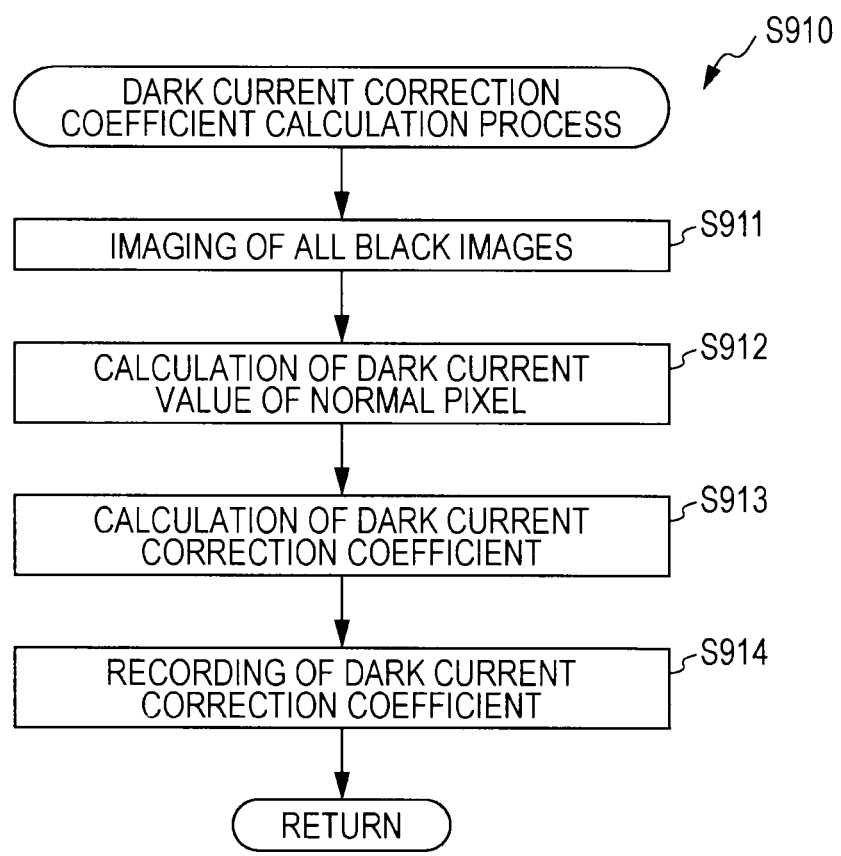
FIG. 14 is a flowchart showing an example of the procedure of a dark current correction coefficient calculation process (Step S910) in the correction coefficient calculation operation in the first embodiment of the disclosure.

FIG. 14 is a flowchart showing an example of the procedure of the dark current correction coefficient calculation process (Step S910) in the correction coefficient calculation operation in the first embodiment of the disclosure.

First, an image (all black image) is captured using the imaging element 200 in a state without light (Step S911). Next, a value of dark current of each normal pixel in the all black image is calculated by the correction coefficient calculation unit 300 based on each normal pixel in the image generation pixel dark current measuring area 222 (Step S912). After that, a dark current correction coefficient is calculated by the correction coefficient calculation unit 300 based on the luminance value of the correction target pixel and the dark current value of the normal pixel having the same color as the correction target pixel for each correction target pixel in the light sensing pixel area 210 (Step S913).

Then, the calculated dark current correction coefficient for each correction target pixel is recorded on the FlashROM 500 (Step S914).

Figure 15:
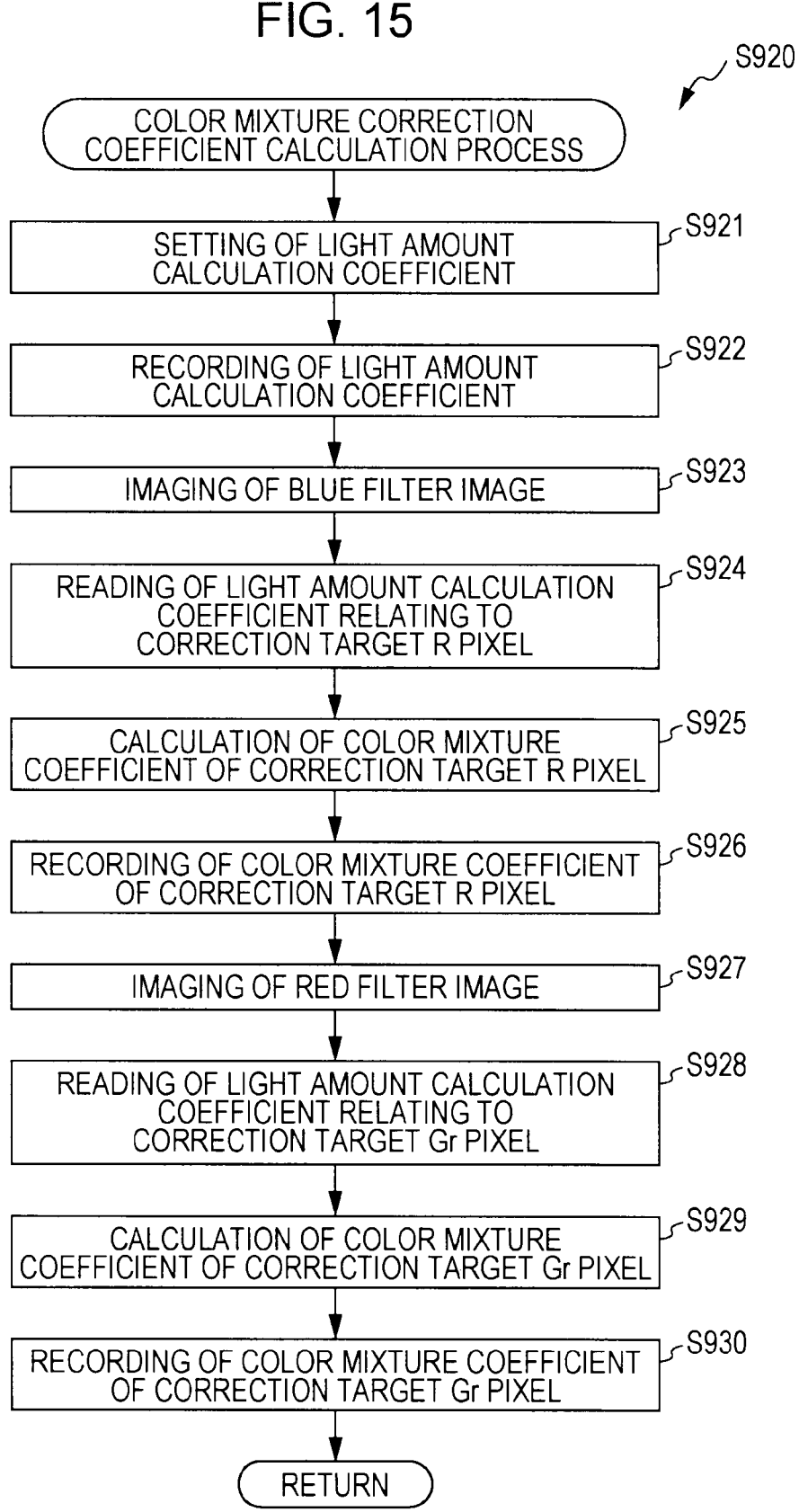
FIG. 15 is a flowchart showing an example of the procedure of a color mixture correction coefficient calculation process (Step S920) in the correction coefficient calculation operation in the first embodiment of the disclosure.

FIG. 15 is a flowchart showing an example of the procedure of the color mixture correction coefficient calculation process (Step S920) in the correction coefficient calculation operation in the first embodiment of the disclosure.

First, light amount calculation coefficients are set for each of the image generation pixels adjacent to the phase difference detection pixels (correction target pixels) in the light sensing pixel area 210 of the imaging element 200 (Step S921). Then, the set light amount calculation coefficients are recorded on the FlashROM 500 (Step S922).

Successively, using the B filter 380, an image (blue filter image) is captured using the imaging element 200 (Step S923). Then, the light amount calculation coefficients of each of the correction target R pixels are read from the FlashROM 500 (Step S924).

Successively, color mixture correction coefficients of the correction target R pixels are respectively calculated for each of the correction target R pixels by the correction coefficient calculation unit 300 based on each of the light amount calculation coefficients and the luminance values of the correction target R pixels in the blue filter image (Step S925). Then, the calculated color mixture correction coefficients are recorded on the FlashROM 500 (Step S926).

After that, using the R filter 390, an image (red filter image) is captured by the imaging element 200 (Step S927). Then, the light amount calculation coefficients of each of the correction target Gr pixels are read from the FlashROM 500 (Step S928).

Successively, color mixture correction coefficients of the correction target Gr pixels are respectively calculated for each of the correction target Gr pixels by the correction coefficient calculation unit 300 based on each of the light amount calculation coefficients and the luminance values of the correction target Gr pixels in the red filter image (Step S929). Then, the calculated color mixture correction coefficients are recorded on the FlashROM 500 (Step S930).

Figure 16:
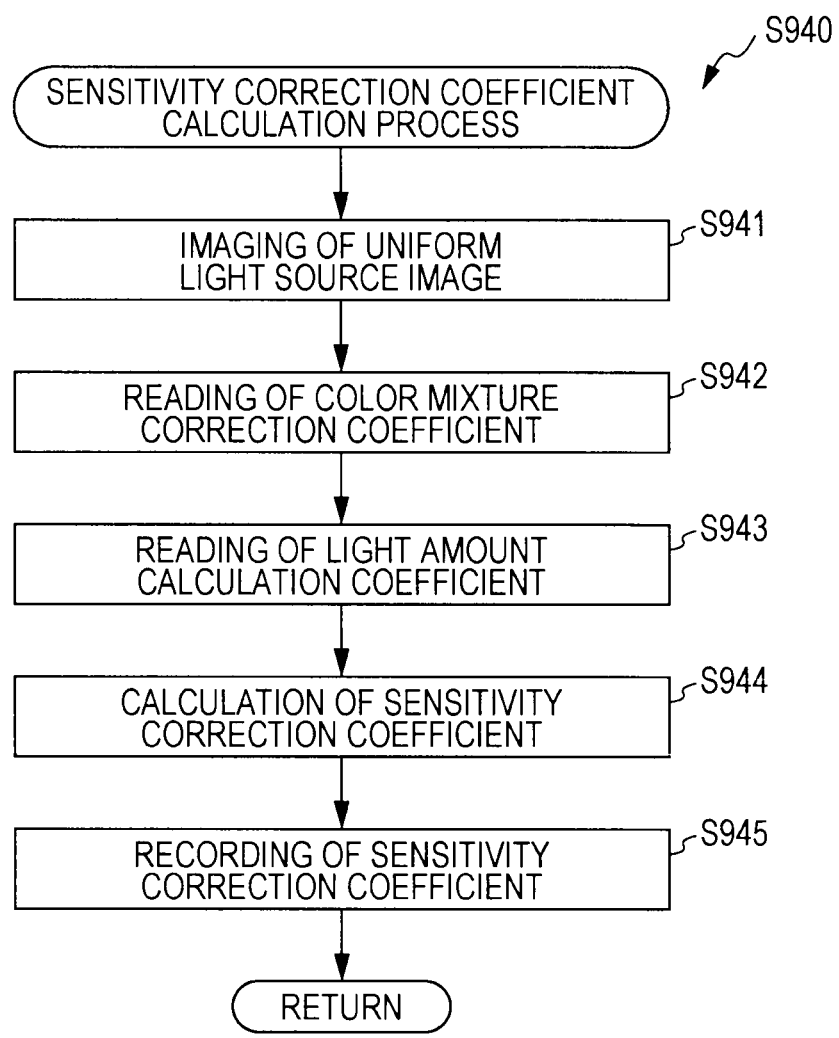
FIG. 16 is a flowchart showing an example of the procedure of a sensitivity correction coefficient calculation process (Step S940) in the correction coefficient calculation operation in the first embodiment of the disclosure.

FIG. 16 is a flowchart showing an example of the procedure of a sensitivity correction coefficient calculation process (Step S940) in the correction coefficient calculation operation in the first embodiment of the disclosure.

First, an image is captured by the imaging element 200 using the light source having the same intensity (uniform light source) over the entire wavelengths (Step S941). Then, the color mixture correction coefficients of the correction target pixels are read from the FlashROM 500 (Step S942). In addition, the light amount calculation coefficients of each of the correction target pixels are read from the FlashROM 500 (Step S942).

Successively, for each of the correction target images, the sensitivity correction coefficients are respectively calculated by the correction coefficient calculation unit 300 based on the luminance value, the color mixture correction coefficient, and the light amount calculation coefficient in the image using the light source of 3200K (Step S944). Then, the calculated sensitivity correction coefficients are recorded on the FlashROM 500 (Step S945).

As such, by the correction coefficient calculation operation, the correction coefficients (dark current correction coefficients, color mixture correction coefficients, and sensitivity correction coefficients) for correcting the difference of the characteristics between the image generation pixels adjacent to the phase difference detection pixels and the image generation pixels not adjacent thereto are calculated.

[One Example of Flow of Signals in Correction Operation]

Figure 17:
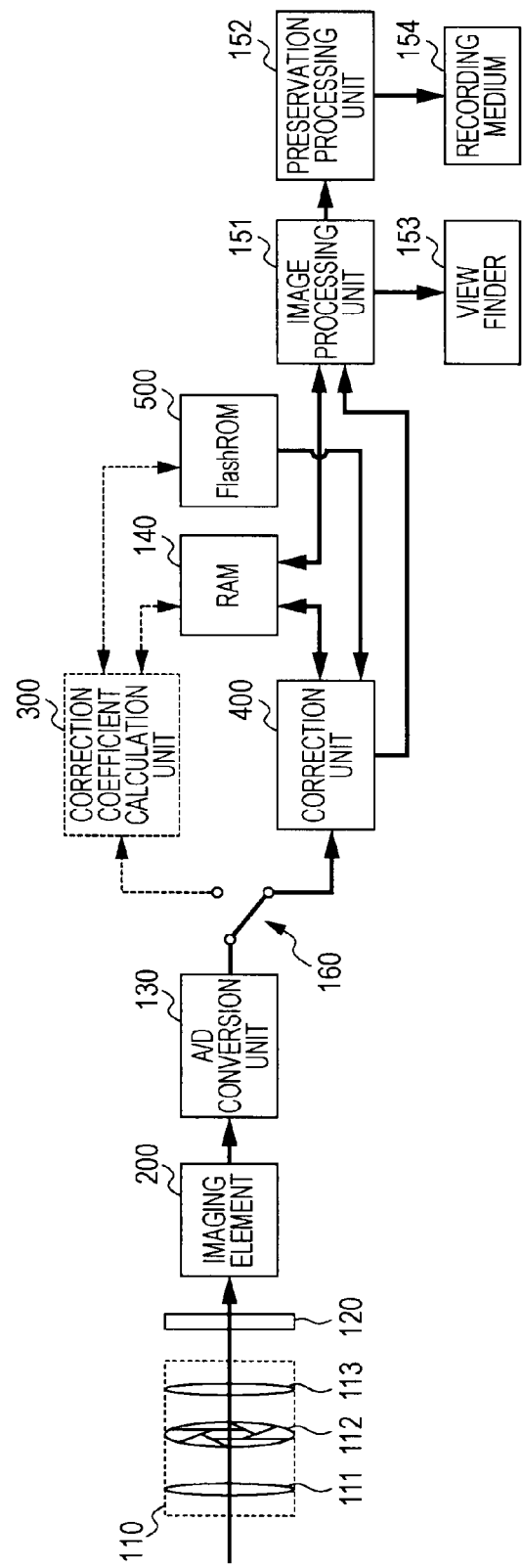
FIG. 17 is a schematic diagram showing an example of the flow of signals in the operation (correction operation) of the imaging device when a luminance value of image generation pixels adjacent to phase difference detection pixels is corrected in the first embodiment of the disclosure.

FIG. 17 is a schematic diagram showing an example of the flow of signals in the operation (correction operation) of the imaging device 100 when the luminance value of the image generation pixels adjacent to the phase difference detection pixels is corrected in the first embodiment of the disclosure.

In the drawing, configurations among each configuration of the imaging device 100 shown in FIG. 1 involved in the correction operation are shown by solid line blocks, and configurations not involved in the correction operation are shown by dotted line blocks. In addition, in FIG. 17, the flow of signals from sensing of light by the imaging element 200 to recording of a captured image on the recording medium 154 is shown by thick black arrows. In addition, in FIG. 17, the operation reception unit 171 and the control unit 172 are omitted for convenience of description.

As shown in the drawing, in the case of the correction operation, the A/D conversion unit 130 and the correction unit 400 are connected to each other by the changeover switch 160. Accordingly, image data digitalized by the A/D conversion unit 130 is supplied to the correction unit 400. In addition, the correction unit 400 reads each correction coefficient from the FlashROM 500, and corrects each characteristic (dark current, color mixture, and sensitivity) using the RAM 140 as a working memory. In addition, the correction unit 400 supplies image data in which the luminance value of the correction target pixels is corrected (corrected image data) to the image processing unit 151, and an image being developed from the corrected image data is recorded on the recording medium 154 or displayed on the view finder 153.

[Functional Configuration Example of Correction Unit]

Figure 18:
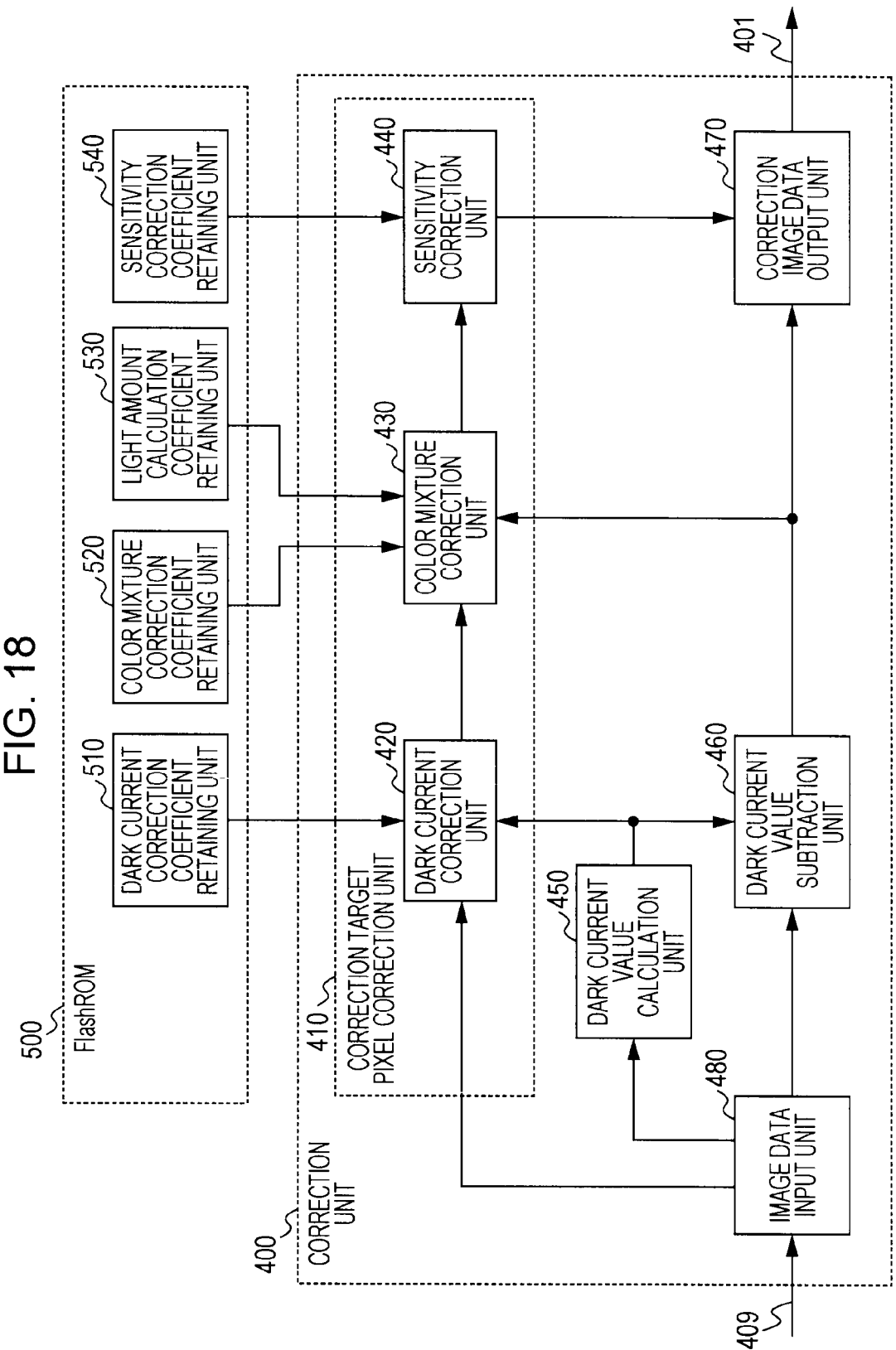
FIG. 18 is a block diagram showing an example of a functional configuration of a correction unit in the first embodiment of the disclosure.

FIG. 18 is a block diagram showing an example of the functional configuration of the correction unit 400 in the first embodiment of the disclosure.

In the drawing, the FlashROM 500 and the correction unit 400 are shown. The FlashROM 500 includes a dark current correction coefficient retaining unit 510, a color mixture correction coefficient retaining unit 520, a light amount calculation coefficient retaining unit 530, and a sensitivity correction coefficient retaining unit 540.

The dark current correction coefficient retaining unit 510 is an area in the FlashROM 500 where dark current correction coefficients are retained. The dark current correction coefficient retaining unit 510 retains the dark current correction coefficients calculated by the correction coefficient calculation unit 300 in the correction coefficient calculation operation. The dark current correction coefficient retaining unit 510 supplies the retaining dark current correction coefficients to a dark current correction unit 420 in a correction target pixel correction unit 410.

The color mixture correction coefficient retaining unit 520 is an area in the FlashROM 500 where color mixture correction coefficients are retained. The color mixture correction coefficient retaining unit 520 retains the color mixture correction coefficients calculated by the correction coefficient calculation unit 300 in the correction coefficient calculation operation. The color mixture correction coefficient retaining unit 520 supplies the retaining color mixture correction coefficients to a color mixture correction unit 430 in the correction target pixel correction unit 410.

The light amount calculation coefficient retaining unit 530 is an area in the FlashROM 500 where light amount calculation coefficients are retained. The light amount calculation coefficient retaining unit 530 retains the light amount calculation coefficients set for each of the correction target pixels. The light amount calculation coefficient retaining unit 530 supplies the retaining light amount calculation coefficients to the color mixture correction unit 430 in the correction target pixel correction unit 410.

The sensitivity correction coefficient retaining unit 540 is an area in the FlashROM 500 where sensitivity correction coefficients are retained. The sensitivity correction coefficient retaining unit 540 retains the sensitivity correction coefficients calculated by the correction coefficient calculation unit 300 in the correction coefficient calculation operation. The sensitivity correction coefficient retaining unit 540 supplies the retaining sensitivity correction coefficients to a sensitivity correction unit 440 in the correction target pixel correction unit 410.

The correction unit 400 includes the correction target pixel correction unit 410, a dark current value calculation unit 450, a dark current value subtraction unit 460, a corrected image data output unit 470, and an image data input unit 480.

When the image data is input from the A/D conversion unit 130, the image data input unit 480 outputs a luminance value of each pixel in the input image data to the dark current value subtraction unit 460 and the correction target pixel correction unit 410. The image data input unit 480 outputs the luminance values of the image generation pixels adjacent to the phase difference detection pixels (correction target pixels) to the correction target pixel correction unit 410. In addition, the image data input unit 480 supplies the luminance values of the image generation pixels not adjacent to the phase difference detection pixels (normal pixels) and the luminance value of the phase difference detection pixels to the dark current value subtraction unit 460. In addition, the image data input unit 480 supplies data of pixels arranged in the optical black area 220 to the dark current value calculation unit 450. Furthermore, the image data input unit 480 is an example of the input unit described in the Claims.

The correction target pixel correction unit 410 is for correcting the luminance values of the correction target pixels. The correction target pixel correction unit 410 includes the dark current correction unit 420, the color mixture correction unit 430, and the sensitivity correction unit 440.

The dark current value calculation unit 450 is for calculating the dark current value of the phase difference detection pixel and the dark current value of the normal pixel shown in FIG. 3. The dark current value calculation unit 450 calculates an average value of the luminance values of the phase difference detection pixels (phase difference detection pixel dark current values) of the phase difference detection pixel dark current measuring area 221 when an image is captured. In addition, the dark current value calculation unit 450 calculates an average value of the luminance values of the normal pixels (normal pixel dark current value) in the image generation pixel dark current measuring area 222. Furthermore, the phase difference detection pixel dark current value and the normal pixel dark current value are calculated for each type of pixel (for each color of color filters and direction of light sensed after pupil-splitting). The dark current value calculation unit 450 supplies the calculated normal pixel dark current value to the dark current value subtraction unit 460. In addition, the dark current value calculation unit 450 supplies the calculated phase difference detection pixel dark current value to the dark current correction unit 420 and the dark current value subtraction unit 460.

The dark current value subtraction unit 460 is for correcting the dark current of the phase difference detection pixels and the normal pixels by subtracting the dark current value from the signal of the phase difference detection pixels and the normal pixels (luminance value) in the captured image. The dark current value subtraction unit 460 supplies the corrected luminance value to the color mixture correction unit 430 and the corrected image data output unit 470.

The dark current correction unit 420 is for correcting the dark current in the signal (luminance value) of the correction target pixels. The dark current correction unit 420 calculates (assumes) the amount of generated dark current of the correction target pixels based on the phase difference detection pixel dark current value and the dark current correction coefficient, and performs the correction of the dark current by subtracting the calculated amount of generated dark current from the luminance value of the correction target pixels. The dark current correction unit 420 supplies the luminance value of the correction target pixel of which dark current is corrected (luminance value after dark current correction) to the color mixture correction unit 430.

The color mixture correction unit 430 is for correcting the color mixture of the correction target pixel. The color mixture correction unit 430 corrects the color mixture by subtracting a value by the color mixture (amount of color mixture) from the luminance value after dark current correction based on the luminance value after dark current correction of the correction target pixel, and the luminance value after dark current correction, the color mixture correction coefficient, and the light amount calculation coefficients of the phase difference detection pixels adjacent to the correction target pixel. In other words, the color mixture correction unit 430 calculates the change value of luminance (amount of color mixture) caused by light leaked from the phase difference detection pixels to the correction target pixel based on each of the luminance values of the phase difference detection pixels adjacent to the correction target pixel, and corrects the color mixture based on the calculated change value. The color mixture correction unit 430 supplies the luminance value (the luminance values of the dark current and color mixture correction) obtained by subtracting (correcting) the amount of color mixture to the sensitivity correction unit 440.

The sensitivity correction unit 440 is for correcting the sensitivity of the correction target pixel. The sensitivity correction unit 440 generates the luminance value obtained by correcting the difference in sensitivity between the correction target pixel and the normal pixel based on the luminance values of the dark current and color mixture and the sensitivity correction coefficients of the correction target pixel. In other words, the sensitivity correction unit 440 corrects the difference in the amount of sensed light caused by the difference in the amount of light lost until light incident to the micro-lens between the correction target pixel and the normal pixel is sensed on the light sensing element based on the luminance value and the sensitivity correction coefficient of the correction target pixel of which the color mixture is corrected. The sensitivity correction unit 440 supplies the luminance value obtained by correcting the sensitivity (corrected luminance value) to the corrected image data output unit 470. Furthermore, sensitivity correction unit 440 is an example of the penetration rate correction unit in the Claims.

The corrected image data output unit 470 is for outputting corrected image data based on the luminance value obtained by correcting the characteristic of the correction target pixel (corrected luminance value), and the luminance value obtained by correcting the dark currents of the phase difference detection pixel and the normal pixel. The corrected image data output unit 470 supplies the corrected image data to the image processing unit 151 via a signal line 401.

Herein, the correction in the correction target pixel correction unit 410 will be described using calculation formulas. The correction of the luminance value ($I_{R325}$) of the R pixel 325 (refer to FIGS. 9A and 9B) in the image data generated by the imaging operation by a user is calculated using, for example, the following Formula 21.

$$I'_{R325} = ((I_{R325} - S_{R325} \times Iave_{dknR}) - T_{R325} \times (Wru_{D321} \times I'_{D321} + Wcu_{D322} \times I'_{D322} + Wlu_{D323} \times I'_{D323})) \times U_{R325} \quad \text{Formula 21}$$

Herein, $Iave_{dknR}$ is a dark current value calculated with the average of the luminance values of the normal R pixels in the image generation pixel dark current measuring area 222 of the imaging element 200 in the image data generated by the imaging operation of a user. $I'_{D321}$ is a luminance value obtained by correcting the dark current of the phase difference detection pixel 321. Furthermore, the correction luminance value ($I'_{D321}$) is calculated by subtracting the phase difference detection pixel dark current value from the luminance value ($I_{D321}$) in the dark current value subtraction unit 460. In the same manner, $I'_{D322}$ is a luminance value obtained by correction the dark current of the phase difference detection pixel 322, and $I'_{D323}$ is a luminance value obtained by correction the dark current of the phase difference detection pixel 323.

Herein, the right side of Formula 21 will be described. ($I_{R325} - S_{R325} \times Iave_{dknR}$) of Formula 21 corresponds to correction in the dark current correction unit 420. The amount of generated dark current of the R pixel 325 is calculated by $S_{R325} \times Iave_{dknR}$, and the calculated amount of dark current is subtracted from the luminance value ($I_{R325}$) of the R pixel 325, thereby correcting the dark current of the R pixel 325.

In addition, the subtraction of $T_{R325} \times (Wru_{D321} \times I'_{D321} + Wcu_{D322} \times I'_{D322} + Wlu_{D323} \times I'_{D323})$ from the value obtained by subtracting the amount of dark current of Formula 21 corresponds to correction in the color mixture correction unit 430. In other words, the color mixture of the R pixel 325 is corrected by subtracting the amount of color mixture of the R pixel 325 from the luminance value from which the amount of dark current is subtracted.

In addition, the multiplication of $U_{R325}$ by the value obtained by correction the amounts of dark current and color mixture corresponds to the correction in the sensitivity correction unit 440. In other words, the sensitivity of the R pixel 325 is corrected by multiplying the luminance value by light which penetrate the color filter of the R pixel 325 and is sensed on the light sensing element (a value obtained by correction the amounts of dark current and color mixture) by the sensitivity correction coefficient.

As such, the luminance values of the image generation pixels adjacent to the phase difference detection pixels are corrected. Furthermore, the correction is performed for each of the image generation pixels adjacent to the phase difference detection pixels, in the same manner as the calculation of the correction coefficients. For example, the correction for the R pixel 326 of FIGS. 9A and 9B is calculated using Formula 22, the correction for the Gr pixel 345 of FIGS. 11A and 11B is calculated using Formula 23, and the correction for the Gr pixel 346 is calculated using Formula 24.

$$I'_{R326}=((I_{R326}-S_{R326} \times Iave_{dknR})-T_{R326} \times (Wru_{D321} \times I'_{D321}+Wcu_{D322} \times I'_{D322}+Wlu_{D323} \times I'_{D323})) \times U_{R326} \quad \text{Formula 22}$$

$$I'_{Gr345}=((I_{Gr345}-S_{Gr345} \times Iave_{dknGr})-T_{Gr345} \times (Wru_{D341} \times I'_{D341}+Wcu_{D342} \times I'_{D342}+Wlu_{D343} \times I'_{D343})) \times U_{Gr345} \quad \text{Formula 23}$$

$$I'_{Gr346}=((I_{Gr346}-S_{Gr346} \times Iave_{dknGr})-T_{Gr346} \times (Wru_{D341} \times I'_{D341}+Wcs_{D342} \times I'_{D342}+Wls_{D343} \times I'_{D343})) \times U_{Gr345} \quad \text{Formula 24}$$

As such, by the correction unit 400, a luminance value is produced which is obtained by correction differences in three characteristics (dark current, color mixture, and sensitivity) between the image generation pixels adjacent to the phase difference detection pixels and the image generation pixels not adjacent to the phase difference detection pixels.

[One Example of Image Generated by Correction Operation]

Figure 19A:
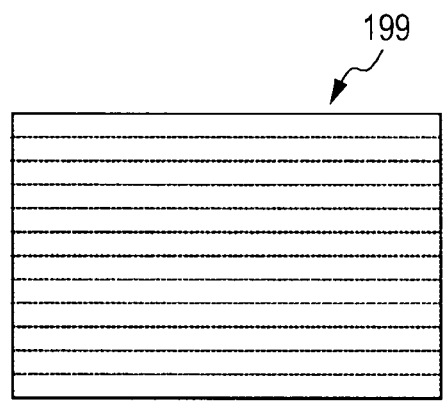
FIGS. 19A and 19B are schematic diagrams showing a captured image which underwent correction of the luminance value of the image generation pixels adjacent to the phase difference detection pixels in the imaging device in the first embodiment of the disclosure and a captured image which did not undergo the correction in an imaging device of the related part.
Figure 19B:
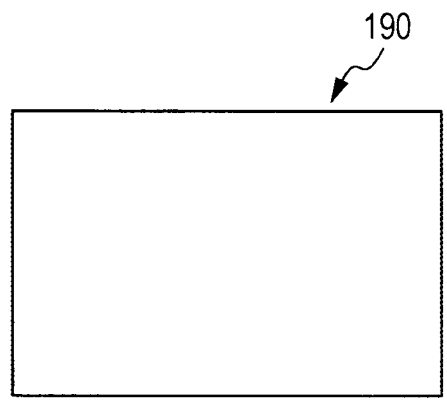

FIGS. 19A and 19B are schematic diagrams showing a captured image which underwent correction of the luminance value of the image generation pixels adjacent to the phase difference detection pixels in the imaging device 100 in the first embodiment of the disclosure and a captured image which did not undergo the correction in an imaging device of the related part.

In FIG. 19A, a captured image in the imaging device of the related art (captured image 199) is shown, in which a difference between the image generation pixels adjacent to the phase difference detection pixels and the image generation pixels not adjacent thereto is not corrected.

In the captured image 199, a difference occurs in the characteristics between the image generation pixels adjacent to the phase difference detection pixels and the image generation pixels not adjacent thereto, and lateral stripes (indicated by dotted lines in the captured image 199) included in the image due to the difference is shown.

In FIG. 19B, a captured image (captured image 190) is shown, which is in the case where the luminance value of the image generation pixels adjacent to the phase difference detection pixels is corrected by the correction unit 400 of the imaging device 100 according to the first embodiment of the disclosure.

In the captured image 190, as a result of correcting the difference in the characteristics between the image generation pixels adjacent to the phase difference detection pixels and the image generation pixels not adjacent thereto by correcting (changing) the luminance value of the phase difference detection pixels, a favorable captured image in which the lateral stripes are lessened is shown.

As such, by performing correction using the correction unit 400, it is possible to suppress deterioration of the image caused by the difference in characteristics between the image generation pixels adjacent to the phase difference detection pixels and the image generation pixels not adjacent thereto.

[Operation Example of Imaging Device in Correction Operation]

Next, the operation of the imaging device 100 in the correction operation according to the first embodiment of the disclosure will be described with reference to drawings.

Figure 20:
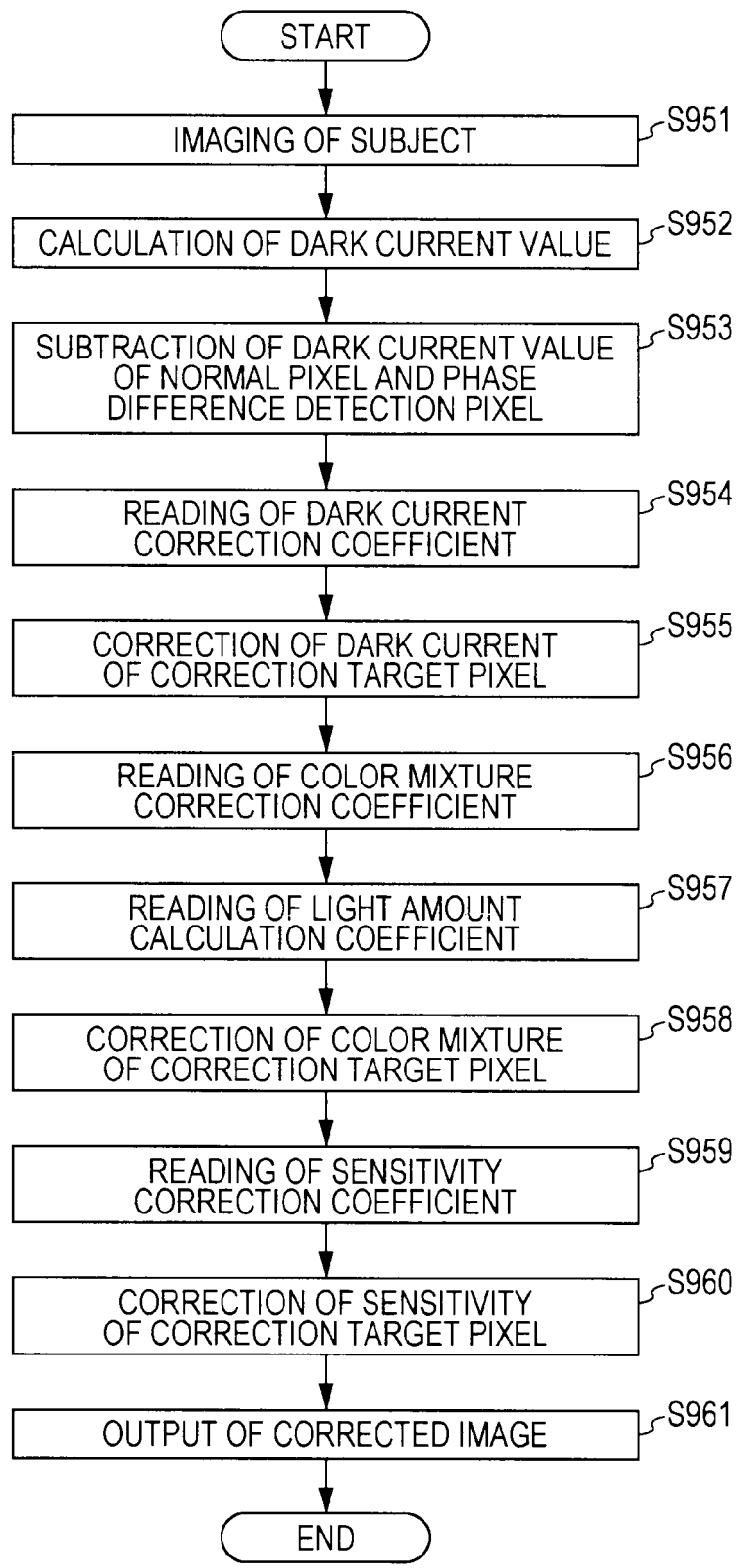
FIG. 20 is a flowchart showing an example of the procedure of a correction process when the imaging device corrects a luminance value of the phase difference detection pixels in the correction operation according to the first embodiment of the disclosure.

FIG. 20 is a flowchart showing an example of the procedure of a correction process when the imaging device 100 corrects the luminance value of the phase difference detection pixels in the correction operation according to the first embodiment of the disclosure. The procedure of the correction process is executed every time a user captures images using the imaging device 100.

First, a user images a subject by operating the imaging device 100 (Step S951). In other words, image data generated by the imaging element 200 is input. Next, values of dark current of each normal pixel and phase difference detection pixel are calculated by the dark current value calculation unit 450 based on signals generated when the pixels of the image generation pixel dark current measuring area 222 and the phase difference detection pixel dark current measuring area 221 image the subject (Step S952). Then, the dark current of the normal pixels and the phase difference detection pixels in the light sensing pixel area 210 is corrected by subtracting each of the values of dark current (Step S953). Furthermore, Step S951 is an example of the input procedure described in the Claims.

Subsequently, the dark current correction coefficients retained in FlashROM 500 are read by the dark current correction unit 420 (Step S954). Then, the dark current of the image generation pixels (correction target pixels) adjacent to the phase difference detection pixels is corrected by the dark current correction unit 420 based on the dark current correction coefficients, phase difference detection pixel dark current values, and the luminance values of the correction target pixels (Step S955).

Subsequently, the color mixture correction coefficients retained in the FlashROM 500 are read by the color mixture correction unit 430 (Step S956). In addition, the light amount calculation coefficients retained in the FlashROM 500 are read by the color mixture correction unit 430 (Step S957). Then, the color mixture of the correction target pixels is corrected by the color mixture correction unit 430 based on the luminance values after dark current correction of the correction target pixels, the luminance values after dark current correction of the phase difference detection pixels adjacent to the correction target pixels, the color mixture correction coefficients, and the light amount calculation coefficients (Step S958). Furthermore, Step S958 is an example of the procedure of the color mixture correction described in the Claims.

Subsequently, the sensitivity correction coefficients retained in the FlashROM 500 are read by the sensitivity correction unit 440 (Step S959). Then, the sensitivity of the correction target pixels is corrected by the sensitivity correction unit 440 based on the luminance values after dark current and color mixture correction of the correction target pixels, and the sensitivity correction coefficients (Step S960).

Then, a corrected image in which correction is completed for all pixels is output (Step S961), and the procedure of the correction process ends.

As such, according to the first embodiment of the disclosure, the difference in the characteristics between the image generation pixels adjacent to the phase difference detection pixels and the image generation pixels not adjacent thereto can be corrected by correcting the luminance value of the image generation pixels adjacent to the phase difference detection pixels. In other words, according to the first embodiment of the disclosure, it is possible to appropriately correct image data generated by the imaging element including both the image generation pixels and other pixels.

2. Second Embodiment

In the first embodiment of the disclosure, an example of the imaging element 200 in which the phase difference detection pixels, which is set as pixels other than the image generation pixels, are arranged is described. However, the pixels other than the image generation pixels are not limited to the phase difference detection pixels. When a difference occurs in any characteristics of dark current, color mixture, and sensitivity between the image generation pixels adjacent to pixels as other pixels (specific pixels) and the image generation pixels not adjacent thereto, the embodiment can be applied thereto. In order to enhance the sensitivity of the imaging element, for example, an imaging element in which white pixels (W pixels) are arranged in addition to the image generation pixels has been considered, but the embodiment of the disclosure can also be applied to such an imaging element.

Thus, in a second embodiment of the disclosure, an example of an imaging device including the imaging element in which the image generation pixels and the white pixels are arranged will be described with reference to FIGS. 21 to 24.

[Arrangement Example of Pixels in Imaging Element]

Figure 21:
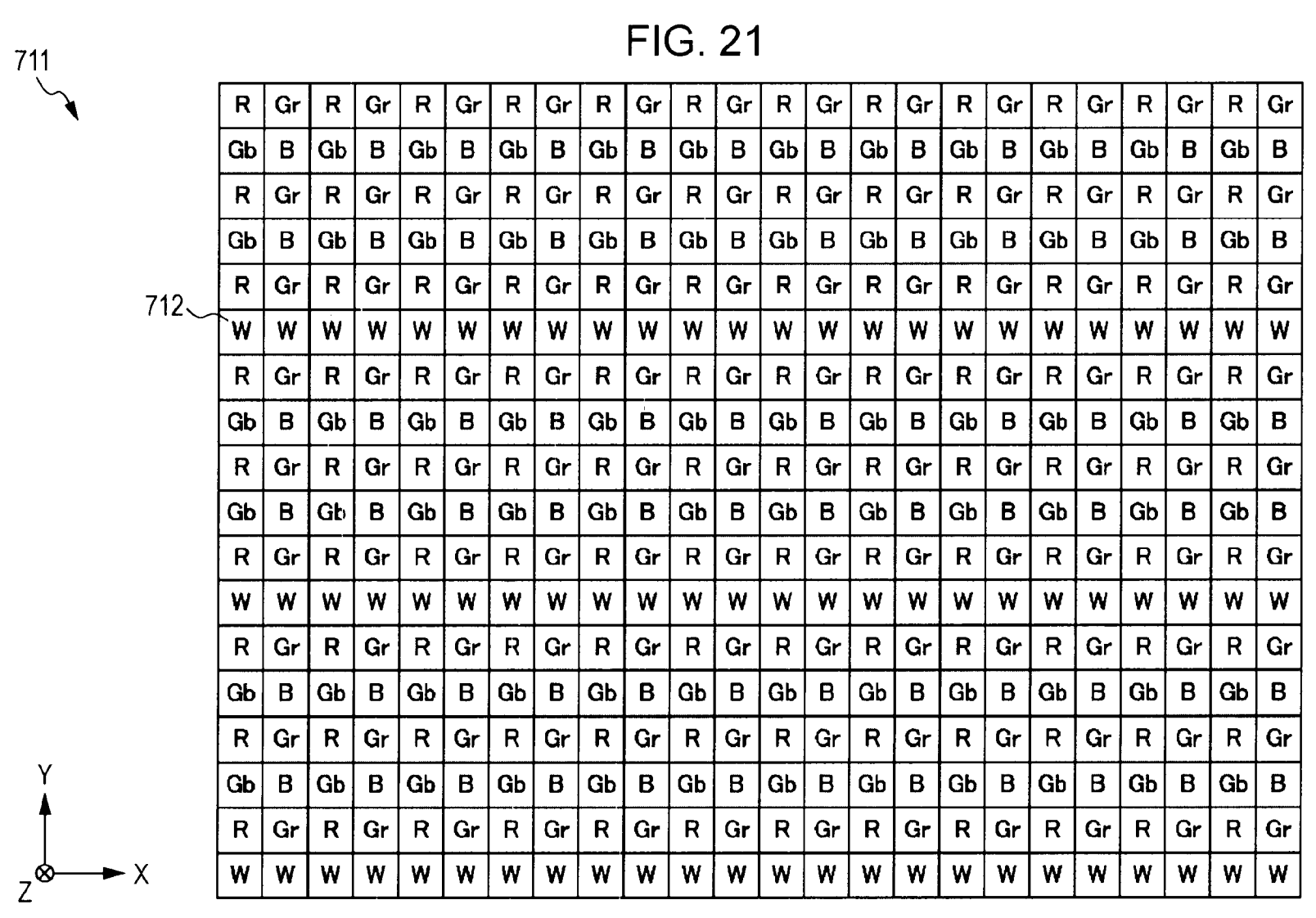

FIG. 21 is a schematic diagram showing an example of the arrangement of pixels included in an imaging element according to the second embodiment of the disclosure.

In the drawing, an area (area 711) of some pixels (pixels of 18 rows and 24 columns) among pixels constituting the imaging element is shown. Furthermore, the drawing corresponds to the area 211 shown in FIG. 4. Thus, differences between the areas 711 and 211 will be described herein.

As shown in FIG. 21, in the imaging element of the second embodiment of the disclosure, white pixels (W pixels 712) are arranged instead of the phase difference detection pixels arranged in the area 211 shown in FIG. 4.

The W pixels 712 include filters (white filters) through which light of the entire wavelengths in the visible light regions penetrates. Furthermore, the W pixels 712 are different from the image generation pixels only in terms of spectral characteristics of the color filters. The cross-sectional configuration of the W pixels 712 is similar to, for example, the R pixel 611 shown in FIGS. 7A and 7B. In other words, since the intensity of the metal layer is the same, the amount of generated dark current in the image generation pixels adjacent to the W pixels 712 and the amount of generated dark current in the image generation pixels not adjacent thereto are the same. Furthermore, with regard to color mixture, since the image generation pixels adjacent to the W pixels 712 and the image generation pixels not adjacent thereto having difference spectral characteristics of the color filters are adjacent to each other, a difference occurs in the amount of color mixture, in the same manner as in the first embodiment of the disclosure.

In addition, a difference occurs in sensitivity, since a difference occurs in the amount of sensed light caused by a difference of the amount of light lost until light incident to the micro-lens is sensed on the light sensing element.

In other words, when the white pixels are arranged as pixels other than the image generation pixels, a color mixture correction coefficient and a sensitivity correction coefficient are calculated in a correction coefficient calculation operation. Then, using the calculated color mixture correction coefficient and sensitivity correction coefficient, color mixture and sensitivity in the image generation pixels adjacent to the white pixels are corrected in a correction operation.

[Functional Configuration Example of Correction Unit]

Figure 22:
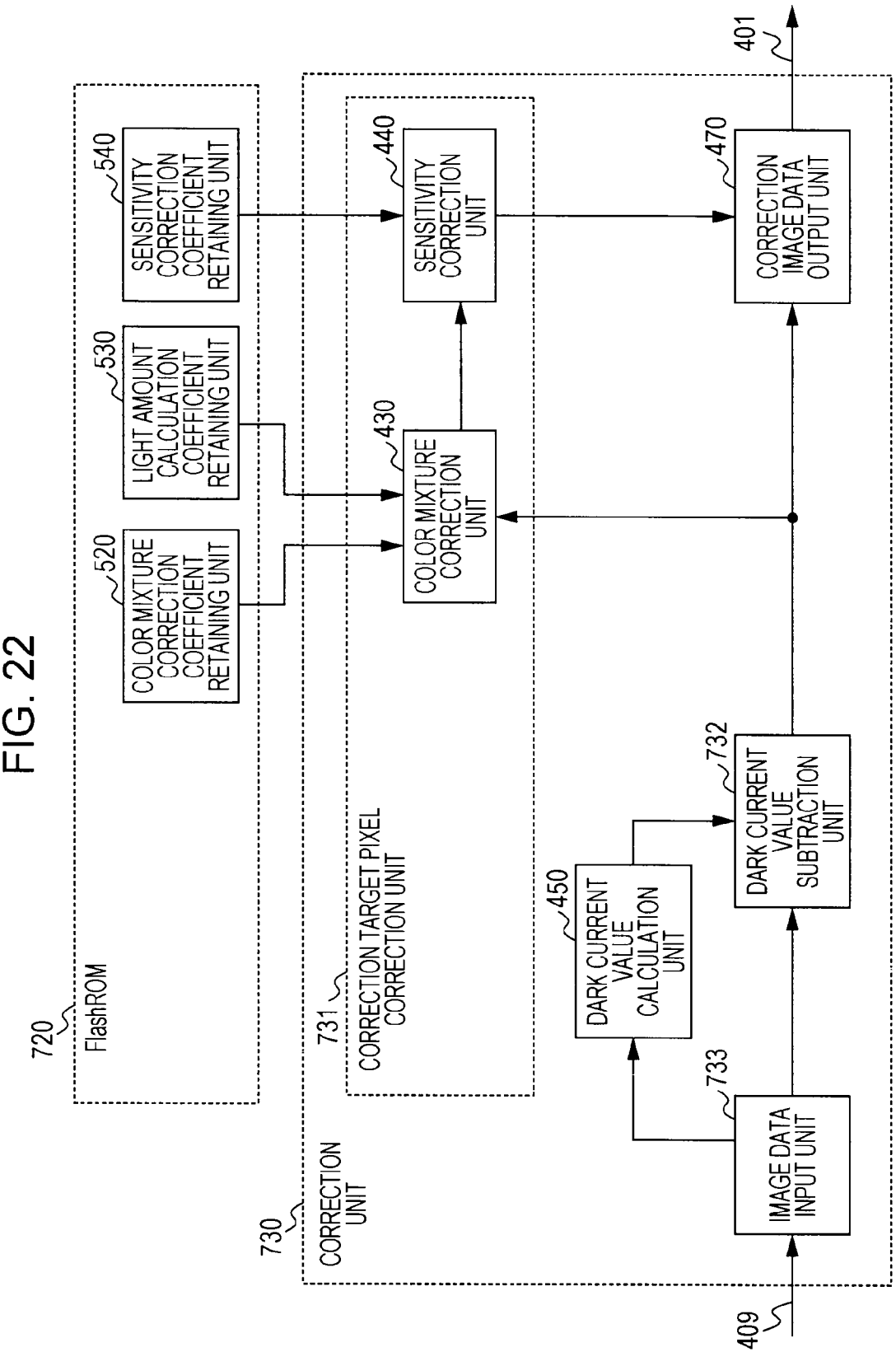
FIG. 22 is a block diagram showing an example of a functional configuration of a correction unit according to the second embodiment of the disclosure.

FIG. 22 is a block diagram showing an example of a functional configuration of a correction unit 730 according to the second embodiment of the disclosure.

The imaging device according to the second embodiment of the disclosure includes the correction unit 730 and a FlashROM 720 instead of the correction unit 400 and the FlashROM 500 (refer to FIG. 1) shown in the first embodiment of the disclosure.

The FlashROM 720 includes a color mixture correction coefficient retaining unit 520, a light amount calculation coefficient retaining unit 530, and a sensitivity correction coefficient retaining unit 540. Furthermore, since the FlashROM 720 is the same one as the FlashROM 500 shown in FIG. 18 except that the dark current correction coefficient retaining unit 510 is not included therein, the same reference numeral is given and description thereof will not be repeated herein.

The correction unit 730 includes a correction target pixel correction unit 731, a dark current value calculation unit 450, a dark current value subtraction unit 732, a corrected image data output unit 470, and an image data input unit 733. Furthermore, since the dark current value calculation unit 450 is the same one as the dark current value calculation unit 450 shown in FIG. 18 except that a dark current value of white pixels (W pixels) is calculated instead of the dark current value of the phase difference detection pixels, the same reference numeral is given and description thereof will not be repeated herein. In addition, since the corrected image data output unit 470 is the same as one shown in FIG. 18, the same reference numeral is given and description thereof will not be repeated herein.

The correction target pixel correction unit 731 is for correcting the luminance value of the image generation pixels (correction target pixels) adjacent to the W pixels. The correction target pixel correction unit 731 includes the color mixture correction unit 430 and the sensitivity correction unit 440. Furthermore, since the color mixture correction unit 430 is the same as the color mixture correction unit 430 shown in the first embodiment except that the luminance value of the correction target pixels of which dark current is corrected in the dark current value subtraction unit 732 is corrected, the same reference numeral is given and description thereof will not be repeated herein. In addition, the sensitivity correction unit 440 is the same as one shown in the first embodiment, the same reference numeral is given and description thereof will not be repeated herein.

The image data input unit 733 is the same as the image data input unit 480 shown in FIG. 18, and supplies luminance values of the correction target pixels, normal pixels, and W pixels to the dark current value subtraction unit 732. In addition, the image data input unit 733 supplies data of pixels arranged in the optical black area 220 to the dark current value calculation unit 450.

The dark current value subtraction unit 732 subtracts the dark current value from the luminance values of the W pixels, the correction target pixels, and the image generation pixels not adjacent to the W pixels (normal pixels). In other words, the dark current value subtraction unit 732 corrects the dark current of all pixels in the image data.

As such, when the image generation pixels adjacent to the W pixels are correction target pixels, the correction of dark current of the correction target pixels can be performed in the same manner as the correction of dark current of the normal pixels. For this reason, the correction unit 730 can correct the luminance value of the correction target pixels without using a dark current correction coefficient.

[Operation Example of Imaging Device in Correction Coefficient Calculation Operation]

Next, the operation of the imaging device in the correction coefficient calculation operation according to the second embodiment of the disclosure will be described with reference to a drawing.

Figure 23:
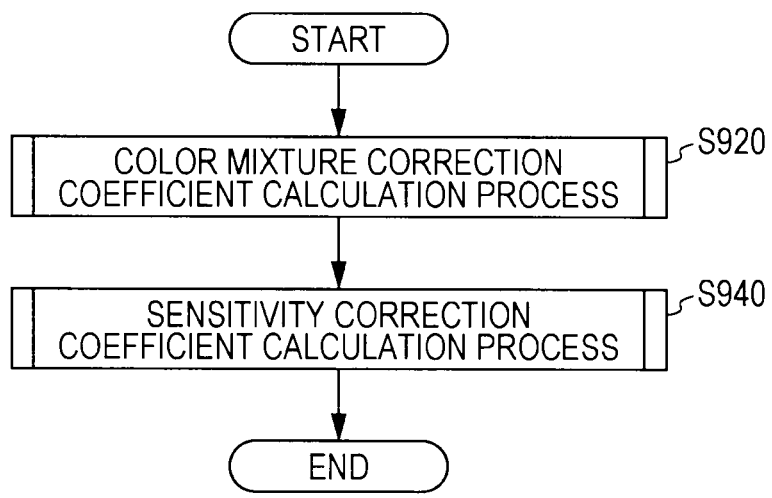
FIG. 23 is a flowchart showing an example of the procedure of a correction coefficient calculation process in an imaging device in a correction coefficient calculation operation according to the second embodiment of the disclosure.

FIG. 23 is a flowchart showing an example of the procedure of a correction coefficient calculation process by the imaging device in a correction coefficient calculation operation according to the second embodiment of the disclosure. The drawing corresponds to FIG. 13 showing the example of the procedure of the correction coefficient calculation process of the first embodiment of the disclosure. Thus, a difference from FIG. 13 will be described.

As shown in FIG. 23, the correction coefficient calculation operation of the second embodiment of the disclosure does not include a dark current correction coefficient calculation process (Step S910). In other words, after the color mixture correction coefficient calculation process (Step S920) is performed, the sensitivity correction coefficient calculation process (Step S940) is performed. Then, when the sensitivity correction coefficient calculation process (Step S940) ends, the procedure of the correction coefficient calculation process ends.

[Operation Example of Imaging Device in Correction Operation]

Figure 24:
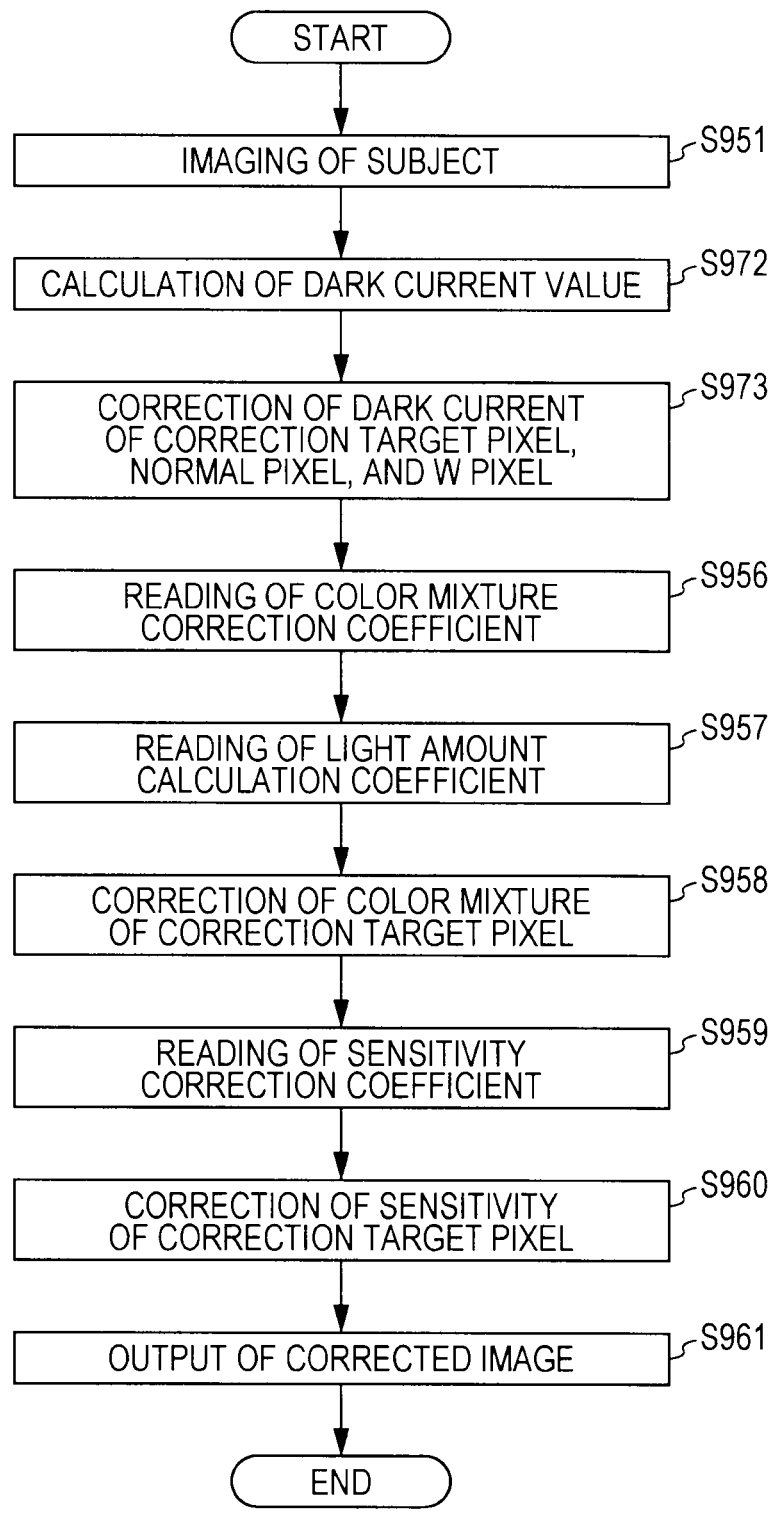
FIG. 24 is a flowchart showing an example of the procedure of a correction process in a correction operation of the imaging device according to the second embodiment of the disclosure.

FIG. 24 is a flowchart showing an example of the procedure of a correction process in a correction operation of the imaging device according to the second embodiment of the disclosure. Furthermore, the drawing corresponds to the example of the procedure of the correction process of the first embodiment of the disclosure shown in FIG. 20. In other words, the procedure of the process is a modified example of FIG. 20, and has a difference in the correction method of dark current of correction target pixels. In addition, since the drawing is the same as FIG. 20 except for the point, the same reference numerals are given to common parts with FIG. 20, and description thereof will not be repeated.

When a subject is imaged (Step S951), the dark current value of the image generation pixels and the dark current value of the W pixels are calculated by the dark current value calculation unit 450 (Step S972). Then, the dark currents of the normal pixels, correction target pixels, and W pixels are corrected by subtracting the dark current values of the image generation pixels and the W pixels (Step S973).

As such, according to the second embodiment of the disclosure, the difference in characteristics between the image generation pixels adjacent to the white pixels and the image generation pixels not adjacent thereto can be corrected by correcting the luminance value of the image generation pixels adjacent to the white pixels. In other words, according to the second embodiment of the disclosure, image data generated by the imaging element including both the image generation pixels and other pixels can be appropriately corrected in the same manner as the first embodiment of the disclosure.

3. Third Embodiment

In the first and second embodiments of the disclosure, the example of the imaging device including the correction coefficient calculation unit 300 is described. As such, as the imaging device includes the correction coefficient calculation unit 300, it is possible to shorten a time relating to correction coefficient calculation in the course of manufacturing. However, since the correction coefficient calculation operation in the correction coefficient calculation unit 300 is performed only in the course of manufacturing, the calculation process may be performed in an arithmetic processing device outside the imaging device, and each correction coefficient of the result may be recorded on the FlashROM.

Thus, in the third embodiment, an example will be described, in which the calculation process of correction coefficients is performed in the arithmetic processing device outside the imaging device and each correction coefficient of the result is recorded on the FlashROM, with reference to FIG. 25.

[Functional Configuration Example of Imaging Device]

Figure 25:
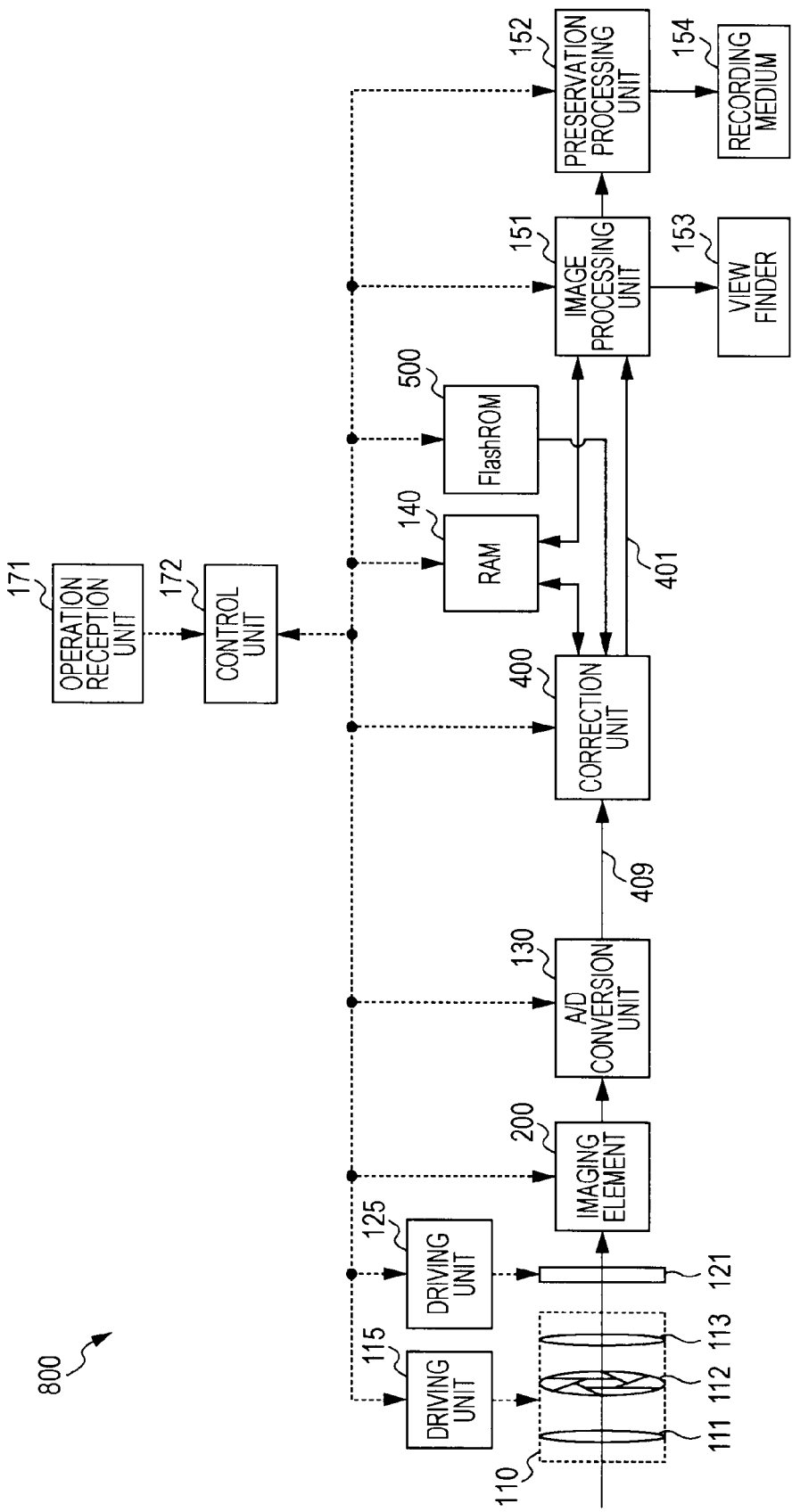
FIG. 25 is a block diagram showing an example of a functional configuration of an imaging device according to a third embodiment of the disclosure.

FIG. 25 is a block diagram showing an example of a functional configuration of an imaging device 800 according to the third embodiment of the disclosure.

The imaging device 800 corresponds to the imaging device 100 shown in FIG. 1. However, the imaging device 800 does not include the changeover switch 160 and the correction coefficient calculation unit 300 that the imaging device 100 includes.

When the correction coefficient calculation operation is performed in the imaging device 800, image data digitalized by the A/D conversion unit 130 is acquired by the external arithmetic processing device, to calculate a dark current correction coefficient, a color mixture correction coefficient, and a sensitivity correction coefficient. Then the calculated three correction coefficients and a light amount calculation coefficient are recorded on the FlashROM 500, and the correction coefficient calculation operation ends.

As such, according to the third embodiment of the disclosure, the image data generated by an imaging element including both image generation pixels and other pixels can be appropriately corrected in the same manner as in the first and second embodiments of the disclosure.

As such, according to the embodiments of the disclosure, image data generated by an imaging element including both image generation pixels and other pixels can be appropriately corrected.

Furthermore, in the embodiments of the disclosure, description is provided assuming that the image generation pixels adjacent to other pixels (phase difference detection pixels and white pixels) are R pixels and Gr pixels. However, the disclosure is not limited thereto, and can be applied to in the same manner when B pixels are adjacent to other pixels. Furthermore, when the B pixels are adjacent to other pixels, and a color mixture correction coefficient is to be calculated, an image is captured using a filter which shields blue light (for example, B filter) for correction.

In addition, in the embodiments of the disclosure, description is provided assuming that the color filters included in the image generation pixels are the color filters of three primary colors (RGB), but they are not limited thereto. The embodiments can be applied to a case where color filters of complementary colors are included in the image generation pixels.

In addition, even if pixels of which an area of one pixel detects light of the entire wavelengths of the visible light region (for example, an imaging element where pixels for blue, pixels for green, and pixels for red are arranged in an overlapping manner in the optical axis direction) are image generation pixels, the embodiments of the disclosure can be applied thereto in the same manner. As such a case, for example, a case can be considered, in which other pixels are phase difference detection pixels and color filters are not included in the phase difference detection pixels and image generation pixels. In this case, it is considered that differences occur in the amount of generated dark current and the amount of color mixture between the image generation pixels adjacent to the phase difference detection pixels and the image generation pixels not adjacent thereto. Thus, in that case, a dark current correction coefficient and a color mixture correction coefficient are calculated in a correction coefficient calculation operation. In addition, in a correction operation, dark current and sensitivity in the image generation pixels adjacent to the phase difference detection pixels are corrected using the calculated dark current correction coefficient and color mixture correction coefficient.

In addition, in the embodiments of the disclosure, description is provided assuming that color filters are not included (light of all wavelengths in the visible light region penetrates) in other pixels (the phase difference detection pixels and white pixels), but the embodiments are not limited thereto. Even when a color filter of another pixel is a filter through which light of a specific wavelength penetrates, the embodiments of the disclosure can be applied in the same manner by using the color filter taking into account the wavelength when a color mixture correction coefficient is calculated.

In addition, in the embodiments of the disclosure, the example is described, in which only the image generation pixels adjacent to other pixels (image generation pixels of which one closest pixel also in terms of inclination includes another pixel) are set to correction target pixels, but the embodiments are not limited thereto. The embodiments of the disclosure can be applied to image generation pixels which have a difference in characteristics from other pixels as the pixels are not adjacent to other pixels but arranged in close positions to other pixels. For example, when other pixels are phase difference detection pixels and distortion occurs in the pixel configuration of the image generation pixels which are apart from the phase difference detection pixels by two or three pixels, the amount of generated dark current can be appropriately corrected by correcting the luminance value of the pixels using a dark current correction coefficient. In addition, when a difference occurs in the amount of light (difference in sensitivity) which is incident to a micro-lens and sensed on a light sensing element also in the image generation pixels apart from other pixels by two or three pixels, the sensitivity can be appropriately corrected by correcting the luminance value of the pixels using a sensitivity correction coefficient. In addition, the same operation can be applied also to color mixture.

Furthermore, the embodiments of the disclosure are for showing an example which realizes the disclosure, and as clarified in the embodiments of the disclosure, aspects in the embodiments of the disclosure have a corresponding relationship with the disclosure-specific aspects in the Claims. In the same manner, the disclosure-specific aspects in the Claims have a corresponding relationship with the aspects in the embodiments of the disclosure which are given the same titles as the foregoing aspects. However, the disclosure is not limited to the embodiments, and can be realized by implementing various modifications to the embodiments without departing from the gist of the disclosure.

In addition, the procedures of the processes described in the embodiments of the disclosure may be understood as a method including such a series of procedures, and may be understood as a program causing a computer to execute the series of procedures or a recording medium storing the program. As such a recording medium, for example, a CD (Compact Disc), an MD (MiniDisc), a DVD (Digital Versatile Disc), a memory card, a Blu-ray Disc (registered trademark), or the like can be used.

The present disclosure contains subject matter related to that disclosed in Japanese Priority Patent Application JP 2010-240227 filed in the Japan Patent Office on Oct. 27, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
one or more processors operable to:
receive image data generated by an imaging element, wherein the imaging element comprises:
a plurality of first pixels and a plurality of second pixels adjacent to the plurality of first pixels,
wherein the image data includes a luminance value for each of the plurality of first pixels and the plurality of second pixels;
correct a color mixture of each of the plurality of second pixels based on a change value of luminance of a corresponding second pixel of the plurality of second pixels and an amount of light leaked from one or more of the plurality of first pixels to the corresponding second pixel,
wherein the amount of light leaked is based on the luminance value of each of the one or more of the plurality of first pixels; and
calculate a sensitivity correction coefficient for each of the plurality of second pixels based on a luminance value of each of one or more pixels of a plurality of third pixels not adjacent to the plurality of first pixels and the corrected color mixture of the corresponding second pixel of the plurality of second pixels.

2. The image processing device according to claim 1, wherein the amount of light leaked is based on a light amount calculation coefficient for each of the one or more pixels of the plurality of first pixels and the luminance value of each of the one or more pixels of the plurality of first pixels; and
wherein a color mixture correction coefficient is calculated for each of the plurality of second pixels based on the change value of luminance and the amount of light leaked from one or more pixels of the plurality of first pixels into the corresponding second pixel of the plurality of second pixels.

3. The image processing device according to claim 2, wherein the one or more processors are further operable to:
store the light amount calculation coefficient for each of the plurality of first pixels; and
store the color mixture correction coefficient for each of the plurality of second pixels.

4. The image processing device according to claim 1, wherein the one or more processors are further operable to:

calculate a dark current correction coefficient for each of the plurality of second pixels based on a dark current value of the corresponding second pixel of the plurality of second pixels and a dark current of one or more pixels of the plurality of third pixels.

5. The image processing device according to claim 1,
wherein the plurality of first pixels have color filters different from color filters of the plurality of second pixels; and
wherein the plurality of first pixels have white filters through which visible light penetrates.

6. The image processing device according to claim 1, wherein, in the imaging element, a first pixel group of which the plurality of first pixels configured to be arranged in a first direction and a second pixel group of which the plurality of pixels configured to be arranged in a first direction are alternately arranged in a second direction orthogonal to the first direction.

7. The image processing device according to claim 6, wherein, in the imaging element, the plurality of second pixels are arranged in a Bayer array in the second pixel group.

8. An imaging device comprising:
one or more processors operable to:
receive image data generated by an imaging element, wherein the imaging element comprises:
a plurality of first pixels and a plurality of second pixels,
wherein the plurality of first pixels have color filters different from color filters of the plurality of second pixels,
wherein the plurality of second pixels are adjacent to the plurality of first pixels, and
wherein the received image data includes a luminance value for each of the plurality of first pixels and the plurality of second pixels;
correct a color mixture of each of the plurality of second pixels based on a change value of luminance of a corresponding second pixel of the plurality of second pixels and amount of light leaked from one or more of the plurality of first pixels to the corresponding second pixel,
wherein the amount of light leaked is based on the luminance value of each of the one or more of the plurality of first pixels; and
calculate a sensitivity correction coefficient for each of the plurality of second pixels based on a luminance value of each of one or more pixels of a plurality of third pixels not adjacent to the plurality of first pixels and the corrected color mixture of the corresponding second pixel of the plurality of second pixels.

9. An image processing device comprising:
one or more processors operable to:
receive image data generated by an imaging element, wherein the imaging element comprises:
a plurality of first pixels;
a plurality of second pixels adjacent to the plurality of first pixels; and
a plurality of third pixels not adjacent to the plurality of first pixels; and
wherein the image data comprises a luminance value for each of the plurality of first pixels, the plurality of second pixels and plurality of third pixels; and
correct a color mixture of each of the plurality of second pixels based on a change value of luminance of a corresponding second pixel of the plurality of second pixels and amount of light leaked from one or more of the plurality of first pixels to the corresponding second pixel,
wherein the amount of light leaked is based on the luminance value of each of the one or more pixels of the plurality of first pixels; and
correct a difference in amount of light incident to micro-lenses and sensed on a light sensing element of each of the plurality of second pixels and amount of light incident to micro-lenses and sensed on a light sensing element of one or more of the plurality of third pixels;
wherein the plurality of second pixels and the plurality of third pixels comprise of color filters with identical spectral characteristics.

10. An image processing device comprising:
one or more processors operable to:
receive image data generated by an imaging element, wherein the imaging element comprises:
a plurality of first pixels, a plurality of second pixels adjacent to the plurality of first pixels and a plurality of third pixels not adjacent to the plurality of first pixels and
wherein the image data comprises a luminance value and dark current value for each of the plurality of first pixels, the plurality of second pixels and the plurality of third pixels; and
correct a color mixture of each of the plurality of second pixels based on a change value of luminance of a corresponding second pixel of the plurality of second pixels and amount of light leaked from one or more pixels of the plurality of first pixels into the corresponding second pixel,
wherein the amount of light leaked is based on the luminance value of each of the one or more of the plurality of first pixels; and
perform dark current correction for each of the plurality of second pixels based on a dark current of the corresponding second pixel of the plurality of second pixels and a dark current value of one or more of the plurality of third pixels.

11. An image processing method comprising:
in an image processing device:
receiving image data generated by an imaging element, wherein the imaging element comprises
a plurality of first pixels and a plurality of second pixels adjacent to the plurality of first pixels and
wherein the image data comprises a luminance value for each of the plurality of first pixels and the plurality of second pixels; and
correcting a color mixture of each of the plurality of second pixels based on a change value of luminance of a corresponding second pixel of the plurality of second pixels and amount of light leaked from one or more of the plurality of first pixels to the corresponding second pixel,
wherein the amount of light leaked is based on the luminance value of each of the one or more pixels of the plurality of first pixels;
calculating a sensitivity correction coefficient for each of the plurality of second pixels based on a luminance value of each of one or more pixels of a plurality of third pixels not adjacent to the plurality of first pixels and the corrected color mixture of the corresponding second pixel of the plurality of second pixels.

12. A non-transitory computer-readable storage medium having stored thereon, a computer program having at least one code section for communication, the at least one code section being executable by a computer for causing the computer to perform steps comprising:

receiving image data generated by an imaging element, wherein the imaging element comprises:

a plurality of first and a plurality of second pixels adjacent to the plurality of first pixels; and wherein the image data comprises a luminance value for each of the plurality of first pixels and the plurality of second pixels; and correcting a color mixture of each of the plurality of second pixels based on a change value of luminance of a corresponding second pixel of the plurality of second pixels and amount of light leaked from one or more of the plurality of first pixels to the corresponding second pixel, wherein the amount of light leaked is based on the luminance value of each of the one or more pixels of the plurality of first pixels;

calculating a sensitivity correction coefficient for each of the plurality of second pixels based on a luminance value of each of one or more pixels of a plurality of third pixels not adjacent to the plurality of first pixels and the corrected color mixture of the corresponding second pixel of the plurality of second pixels.

13. The image processing device according to claim 1, wherein the one or more first pixels are phase difference detection pixels operable to perform focus determination by phase difference detection;

wherein the one or more second pixels are image generation pixels operable to generate an image; and wherein the one or more first pixels have color filters different from color filters of the one or more second pixels or a configuration different from the one or more second pixels.

14. The image processing device according to claim 9, wherein the luminance value for each of the plurality of first pixels, the plurality of second pixels and plurality of third pixels is a luminance value in white light for each of the plurality of first pixels, the plurality of second pixels and plurality of third pixels.

15. The image processing device according to claim 10, wherein the dark current value for each of the plurality of second pixels and the plurality of third pixels is a luminance value in absence of light for each of the plurality of second pixels and the plurality of third pixels.

* * * * *